United States Patent [19]

Ishiwatari et al.

[11] Patent Number: 5,602,652
[45] Date of Patent: Feb. 11, 1997

[54] PORTABLE DEVICE SETTABLE IN A HOST APPARATUS AND COMBINED SYSTEM THEREFOR

[76] Inventors: Masumi Ishiwatari; Tsuyoshi Kawanabe, both of c/o Canon Kabushiki Kaisha, 30-2, 3-chome, Shimomaruko, Ohta-ku, Tokyo,, Japan

[21] Appl. No.: 299,804

[22] Filed: Sep. 1, 1994

Related U.S. Application Data

[63] Continuation of Ser. No. 62,168, May 17, 1993, abandoned, which is a continuation of Ser. No. 866,279, Apr. 19, 1992, abandoned, which is a continuation of Ser. No. 538,971, Jun. 15, 1990, abandoned.

[30] Foreign Application Priority Data

Jun. 16, 1989 [JP] Japan ..................... 1-154164

[51] Int. Cl.$^6$ .................................... H04N 1/387
[52] U.S. Cl. ........................... 358/450; 382/284
[58] Field of Search ..................... 358/434, 440, 358/444, 468, 450, 451; 379/144, 442, 443; 340/870.28, 870.29; 235/491; 382/284, 298; H04N 1/21, 1/32

[56] References Cited

U.S. PATENT DOCUMENTS

| | | | |
|---|---|---|---|
| 4,113,992 | 9/1978 | Gorham et al. | 179/90 B |
| 4,126,768 | 11/1978 | Grenzow | 179/90 B |
| 4,449,206 | 5/1984 | Tokitsu et al. | 365/229 |
| 4,454,414 | 6/1984 | Benton | 235/379 |
| 4,542,378 | 9/1985 | Suganuma et al. | 340/734 |
| 4,622,592 | 11/1986 | Ikehata et al. | 358/257 |
| 4,900,902 | 2/1990 | Sakakibara | 235/375 |
| 4,956,721 | 9/1990 | Tasaki et al. | 358/402 |
| 4,978,840 | 12/1990 | Anegawa | 235/492 |
| 5,072,310 | 12/1991 | Yamamoto et al. | 358/448 |
| 5,150,221 | 9/1992 | Shima | 358/403 |
| 5,191,430 | 3/1993 | Sudoh et al. | 358/296 |

FOREIGN PATENT DOCUMENTS

| | | | |
|---|---|---|---|
| 58-69163 | 4/1983 | Japan | 358/468 |
| 58-105667 | 6/1983 | Japan | 358/440 |
| 58-138165 | 8/1983 | Japan | 358/468 |
| 1-226249 | 9/1989 | Japan | 358/440 |

*Primary Examiner*—Andrew Johns

[57] ABSTRACT

An image transmission system utilizing a portable device includes a light-receiving unit, a unit for generating image data on the basis of an output from the light-receiving unit, and a unit for transmitting the image data generated by the generating unit. The portable device includes a light-emitting unit, and a control unit for causing the light-emitting unit to emit light in accordance with call data and image data.

65 Claims, 34 Drawing Sheets

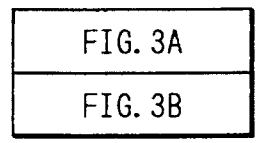
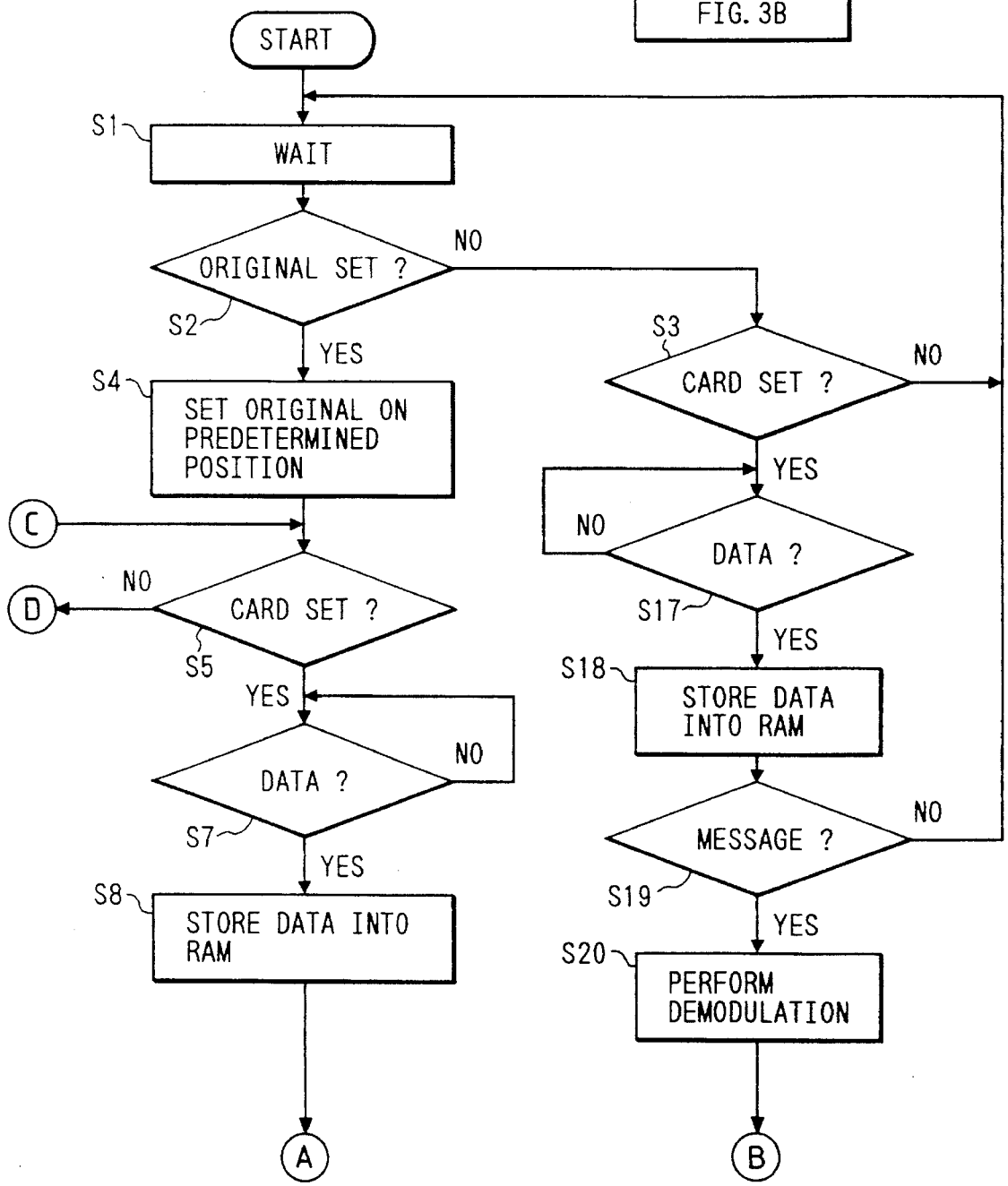

FIG. 7

| LOWER\UPPER | 0 | 1 | 2 | 3 | 4 | 5 | 6 | 7 | 8 | 9 | * | # | | | | |
|---|---|---|---|---|---|---|---|---|---|---|---|---|---|---|---|---|
| 0 | SPACE | — | 8 | D | P | ¥ | ア | エ | タ | フ | リ | | | | | |
| 1 | | | 9 | E | Q | | イ | オ | チ | ヘ | ル | | | | | |
| 2 | | | : | F | R | | ウ | カ | ツ | ホ | レ | | | | | |
| 3 | # | / | | G | S | | エ | キ | テ | マ | ロ | | | | | |
| 4 | $ | Ø | = | H | T | | オ | ク | ト | ミ | ワ | | | | | |
| 5 | % | 1 | | I | U | → | ャ | ケ | ナ | ム | ン | | | | | |
| 6 | | 2 | | J | V | ← | ュ | コ | ニ | メ | ゛ | | | | | |
| 7 | | 3 | | K | W | . | ヨ | サ | ヌ | モ | ゜ | | | | | |
| 8 | ( | 4 | | L | X | | ッ | シ | ネ | ヤ | | | | | | |
| 9 | ) | 5 | A | M | Y | | ア | ス | ノ | ユ | | | | | | |
| * | * | 6 | B | N | Z | | イ | セ | ハ | ヨ | | | | | | |
| # | + | 7 | C | O | | ヲ | ウ | ソ | ヒ | ラ | | | | | | |

FIG. 9

'89. 3. 3  12:34   ジムキ キカク   ジムキ キカク   ジムキ カイハツ 001
                  JIMUKI KIKAKU  JIMUKI KIKAKU  JIMUKI KAIHATSU

FACSIMILE MESSAGE

To 事務機 企画               From 事務機 開発
   鈴木 殿                        山本
TO JIMUKI KIKAKU             FROM JIMUKI KAIHATSU
MR. SUZUKI                   YAMAMOTO
Tel                          Tel

RE 新製品企画書 送付について
   TRANSMISSION OF PLANNING DOCUMENTS FOR NEW PRODUCTS

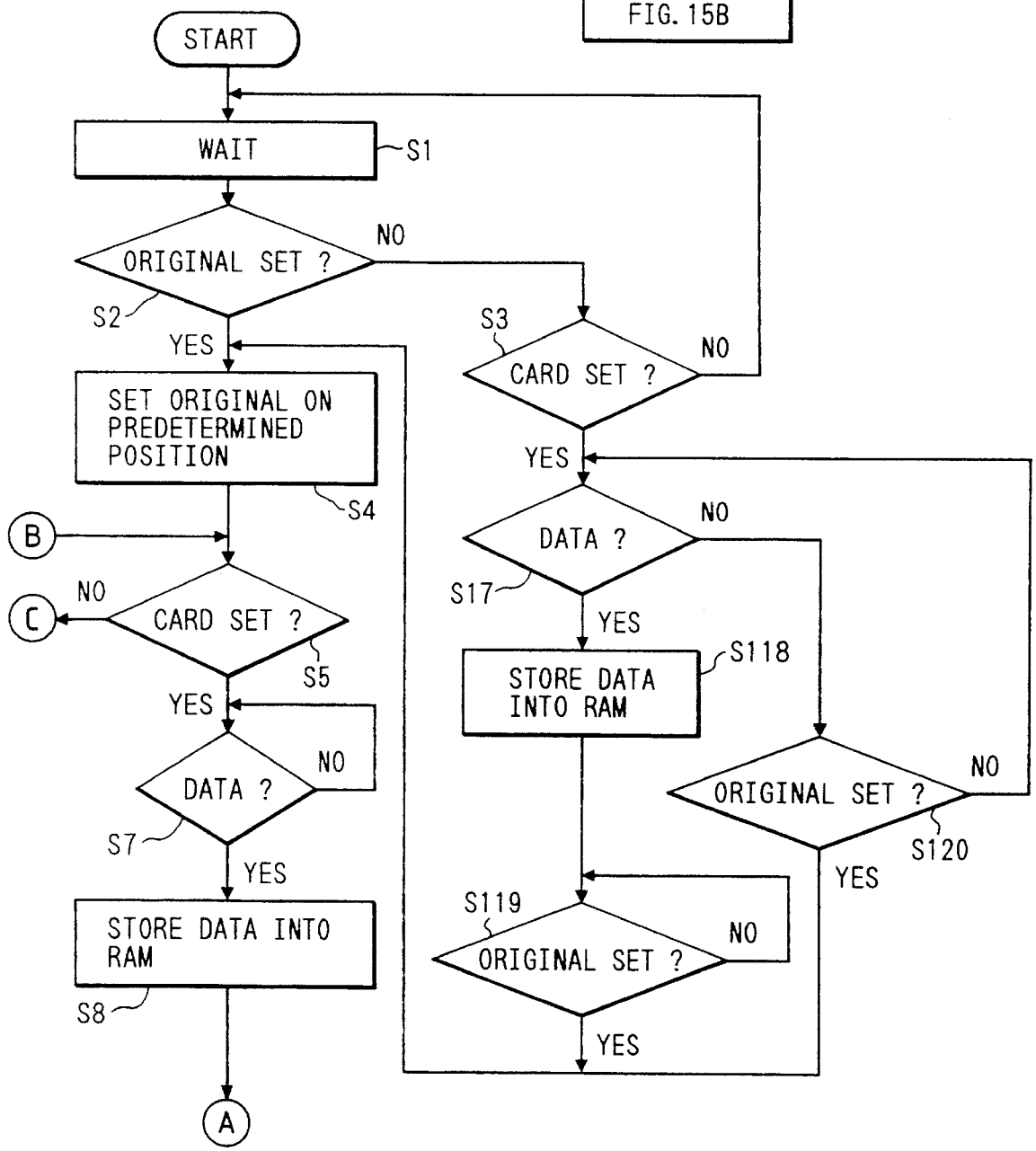

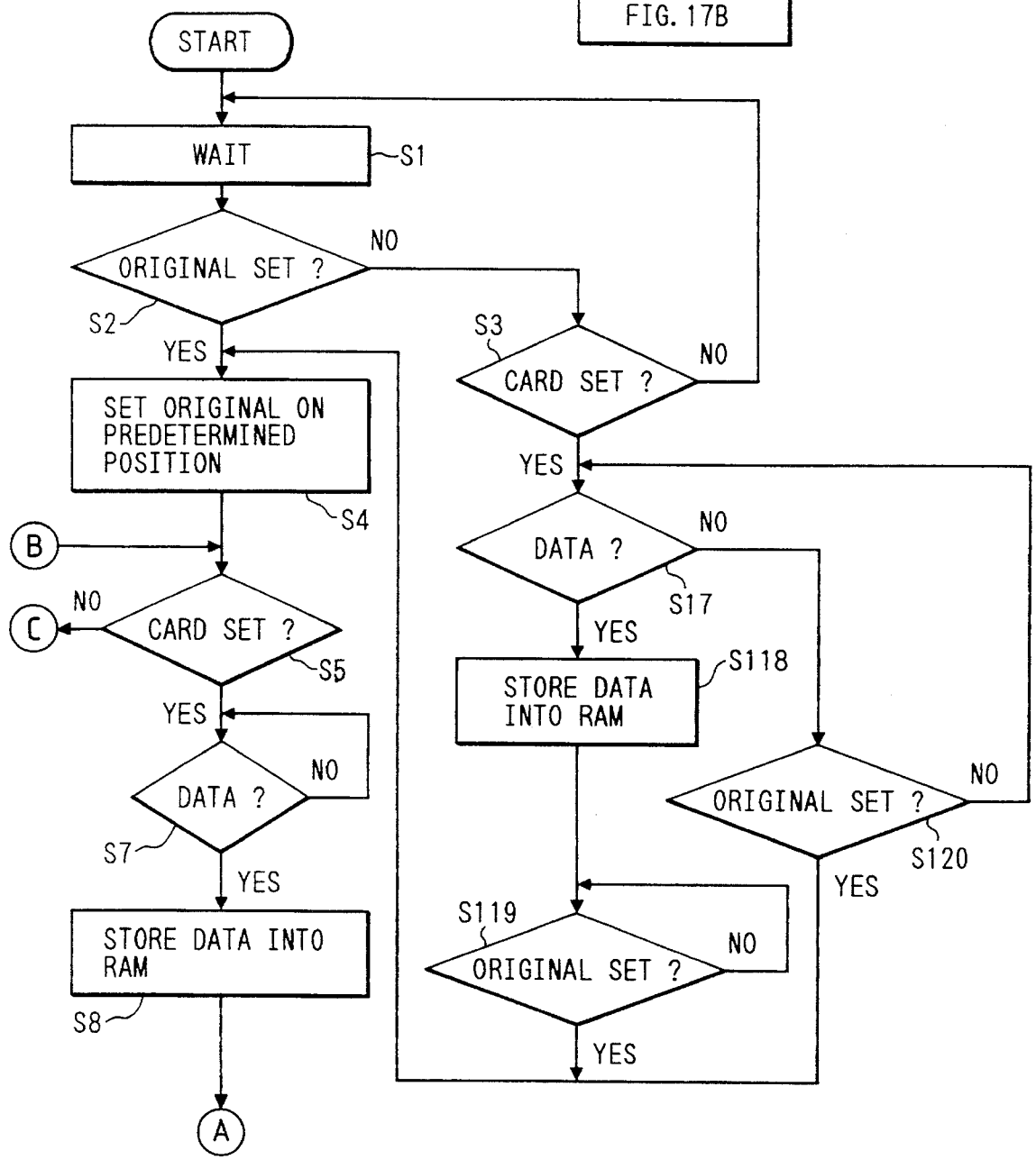

FACSIMILE MESSAGE

001

To ジムキ キカク
スズキ ドノ
TO JIMUKI KIKAKU
MR. SUZUKI

From ジムキ カイハツ
ヤマモト
FROM JIMUKI KAIHATSU
YAMAMOTO

FACSIMILE MESSAGE VIA FAX

001

| DATE: | REF NO. CTPE- / | PAGE / |
|---|---|---|
| TO: ジムキ キカク<br>スズキ ドノ<br>TO JIMUKI KIKAKU<br>MR. SUZUKI | FROM: ジムキ カイハツ<br>ヤマモト<br>FROM JIMUKI KAIHATSU<br>YAMAMOTO | |
| ATTN : | TEL: | |
| CC: | | |
| RE: 新製品企画書 送付について<br>TRANSMISSION OF PLANNING DOCUMENTS FOR NEW PRODUCTS | | |

FIG. 30

'89. 3. 3  12:34    Canon FACSIMILE MESSAGE    REF. NO 005    001

To ジムキ キカク          From ジムキ カイハツ
   スズキ ドノ                ヤマモト
TO JIMUKI KIKAKU          FROM JIMUKI KAIHATSU
MR. SUZUKI                     YAMAMOTO
Tel                           Tel 29-1, 29-2, 29-3, 29-4

FIG. 31

'89.3.3  12:34    FACSIMILE MESSAGE    REF. NO 005    001

To ジムキ キカク
   スズキ ドノ
TO JIMUKI KIKAKU
MR. SUZUKI
Tel

From ジムキ カイハツ
     ヤマモト
FROM JIMUKI KAIHATSU
YAMAMOTO
Tel

RE 新製品企画書 送付について
TRANSMISSION OF PLANNING DOCUMENTS FOR NEW PRODUCTS

PORTABLE DEVICE SETTABLE IN A HOST APPARATUS AND COMBINED SYSTEM THEREFOR

This application is a continuation-in-part of application Ser. No. 08/062,168 filed on May 17, 1993, now abandoned, which is a continuation of Ser. No. 07/866,279 filed on Apr. 13, 1992, now abandoned, which is a continuation of Ser. No. 07/538,971 filed on Jun. 15, 1990, now abandoned.

BACKGROUND OF THE INVENTION

1. Field of the Invention

The present invention relates to a system comprising a portable device storing data such as image data and an apparatus for performing image transmission and image recording based on the image data received from the portable device.

2. Related Background Art

For example, in a, conventional facsimile apparatus, an original image is read and transmitted. In addition, when a destination is registered as an abbreviated dial number, a company name or a name of a department or section is read out from a facsimile main body, the readout data is added to the original image, and the resultant information is then transmitted.

In addition, a name of a sender is also read out from a memory, and the readout data is added to the transmission data.

When one facsimile apparatus is shared by a plurality of users, the different users often transmit information to different destinations. In the conventional facsimile apparatus, since the number of entries to be registered as abbreviated dial numbers is limited, the individual users cannot register names of companies and the like in the memory of the facsimile main body, thus resulting in inconvenience.

When the conventional facsimile apparatus is shared by the plurality of users, the senders' names cannot be registered in the memory of the facsimile apparatus and used.

SUMMARY OF THE INVENTION

It is an object of the present invention to provide an image transmission apparatus capable of accurately receiving image data from a portable device by using a light signal.

It is another object of the present invention to provide an image transmission apparatus capable of accurately receiving image data and call data from a portable device by using a light signal.

It is still another object of the present invention to provide an image transmission apparatus for transmitting image data received from a portable device and image data generated by the image transmission apparatus.

It is still another object of the present invention to provide an image transmission apparatus capable of performing image transmission by adding image data from the image transmission apparatus thereto when image data from a portable device cannot be received.

It is still another object of the present invention to provide a data processing apparatus for exchanging data with a portable device by using a light signal.

It is still another object of the present invention to provide an image recording apparatus for recording an image corresponding to a light signal from a portable device.

It is still another object of the present invention to provide an image recording apparatus for synthesizing an image corresponding to a light signal from a portable device and another image and recording a synthesized image.

It is still another object of the present invention to provide a portable device for transmitting image data to a host apparatus upon generation of light in correspondence with image data.

It is still another object of the present invention to provide a portable device for transmitting call data and image data to an image transmission apparatus upon generation of light in correspondence with the call data and the image data.

It is still another object of the present invention to provide a portable device for transmitting data by a light signal to a host apparatus in response to a demand represented by the light signal from the host apparatus.

The above and other objects, features, and advantages of the present invention will be apparent from the following detailed description in conjunction with the accompanying drawings.

BRIEF DESCRIPTION OF THE DRAWINGS

FIG. 7 is a table showing codes of DTMF signals according to the first embodiment of the present invention;

FIG. 9 is a view showing a conventional print-out result;

FIGS. 18 to 22 are views showing print-out results according to the third embodiment of the present invention, respectively;

FIGS. 30 and 31 are views showing print-out results according to the sixth embodiment of the present invention.

DETAILED DESCRIPTION OF THE PREFERRED EMBODIMENTS

First Embodiment

Figure 1:
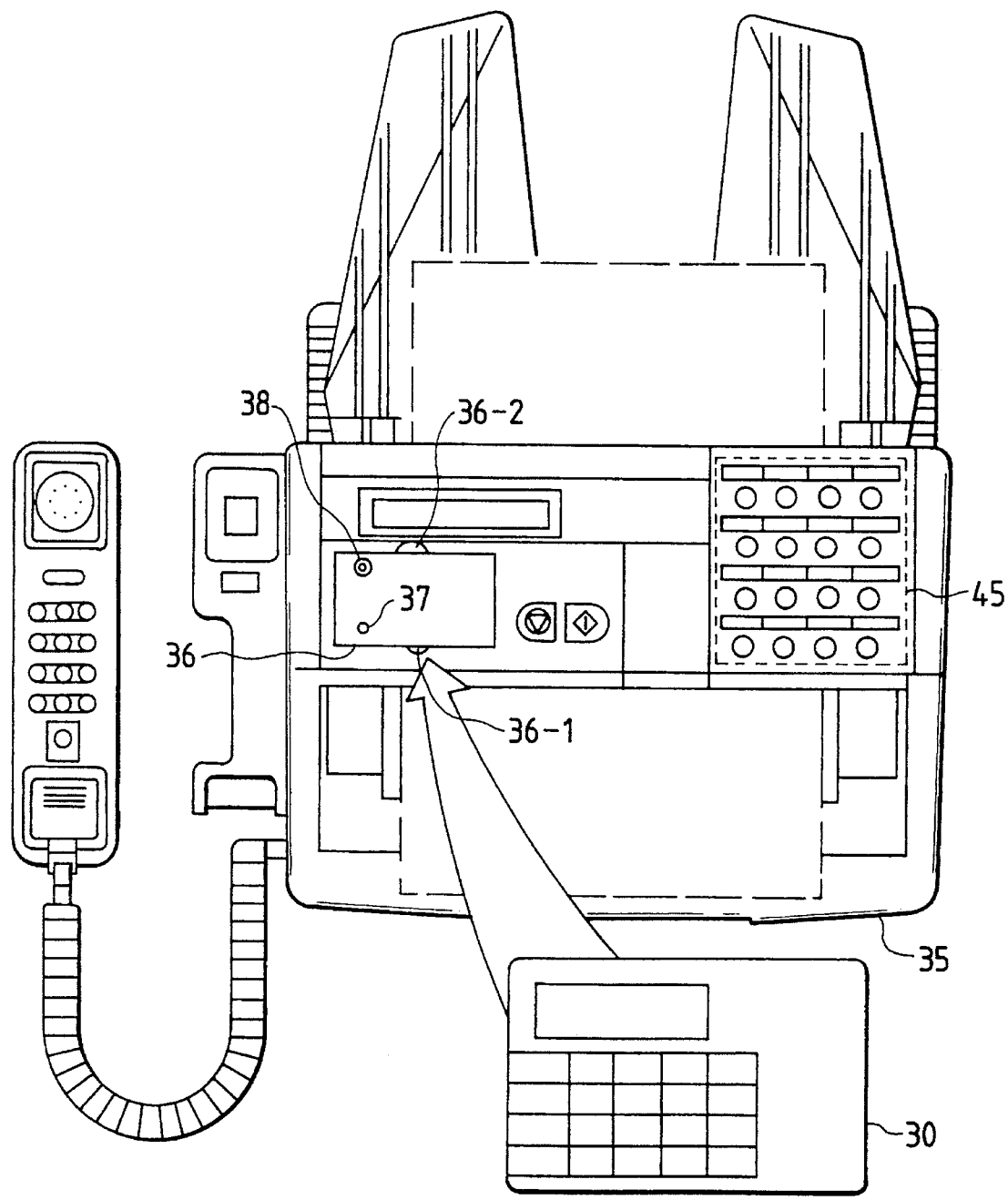
FIG. 1 is a plan view of a facsimile apparatus according to the first embodiment of the present invention.

In this embodiment, as shown in FIG. 1, an electronic data memorandum 30 like a credit card is set on an operation panel of a facsimile apparatus 35, and the electronic data memorandum 30 transmits a dial number and a message to the facsimile apparatus 35.

This embodiment will be described in more detail with reference to the accompanying drawings.

Figure 5:
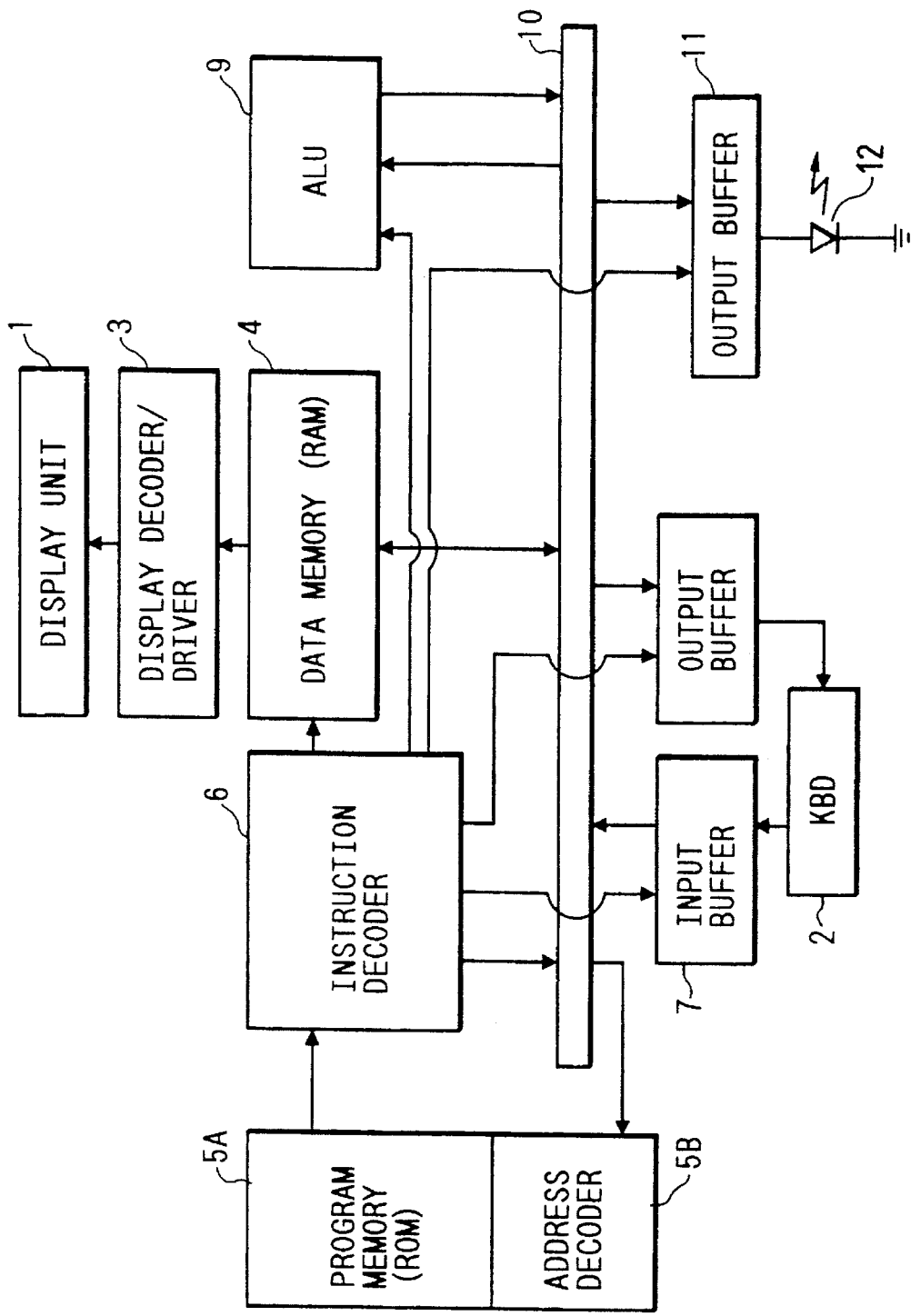
FIG. 5 is a block diagram showing the electronic data memorandum according to the first embodiment of the present invention.

FIG. 5 is a block diagram showing an arrangement of the electronic data memorandum having a credit card size. The electronic data memorandum 30 comprises a ROM (Read-Only Memory) 5A serving as a program memory for storing processing sequences (to be described later). An instruction stored at an address designated by an address decoder 5B is decoded by an instruction decoder 6 to control the respective components. More specifically, data stored in a data memory 4 comprising, e.g., a RAM (Random Access Memory) is sent to an arithmetic and logic unit (ALU) 9 through a data bus 10, and an arithmetic operation is performed. An arithmetic operation result is stored in the RAM 4 again through the data bus 10. Data stored in the RAM 4 is sent to a display decoder/driver 3 to drive a display unit 1, and the RAM data is displayed on the display unit 1.

When any one of the key switches on a keyboard 2 is operated, the instruction decoder 6 receives this key input signal from an input buffer 7 and stores it in the RAM 4. The stored data is decoded, and a processing sequence of the ROM 5A corresponding to the depressed key is executed. The instruction decoder 6 outputs dial data from the RAM 4 to an output buffer 11 through the data bus 10 to drive an LED (Light-Emitting Diode) 12, so that a light signal is Output.

Figure 6:
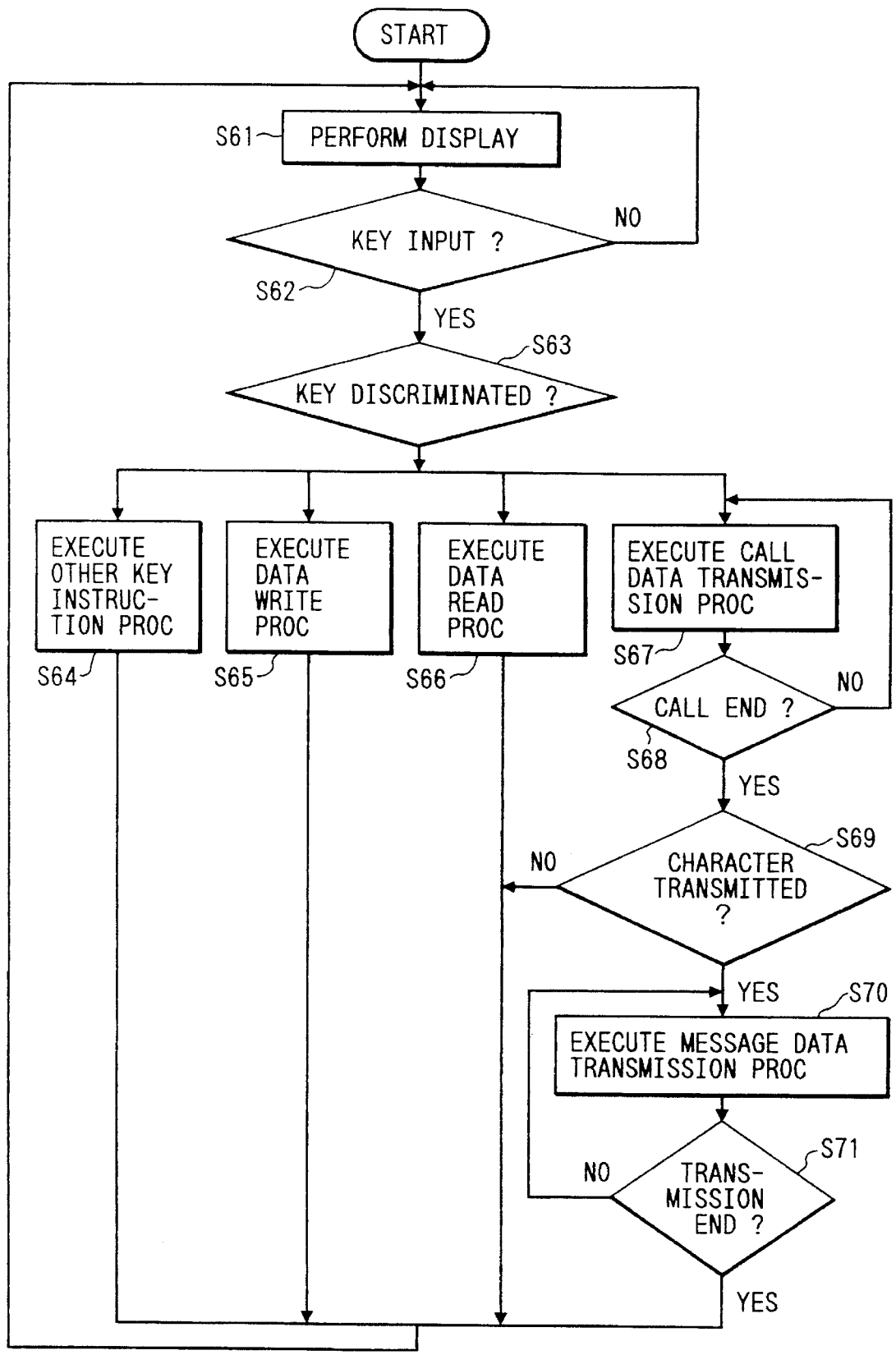
FIG. 6 is a flow chart of the electronic data memorandum according to the first embodiment of the present invention.

FIG. 6 shows a transmission processing sequence for a telephone number or the like by the electronic data memorandum of this embodiment. In step S61, RAM data to be displayed is selected and displayed on the display unit 1. It is determined in step S62 whether a key input is discriminated. If NO in step S62, the flow returns to step S61. However, if YES in step S62, the flow advances to step S63 to discriminate what processing is required by this key input. For example, if processing in step S65 is discriminated, numeric/character data input through other instruction key processing routines in step S64 is written in the RAM 4 of FIG. 5.

For example, when a cursor is located in a character data display section 1-1 in a Tel (telephone) mode, a kana/alphanumeric key 2-2 of the electronic data. memorandum (plan view in FIG. 4) is used to select whether to write name data in the alphabet or kana characters. Character data is then input using character keys 2-3 shown in FIG. 4. Number data is input by shifting the cursor to a numeric data display section 1-2 using the character keys 2-3 (FIG. 3) in a numeric input state. On the other hand, when it is determined in step S63 that data call processing is discriminated, data written in the RAM 4 is displayed on the display unit 1 shown in FIG. 5 in step S65.

Figure 4:
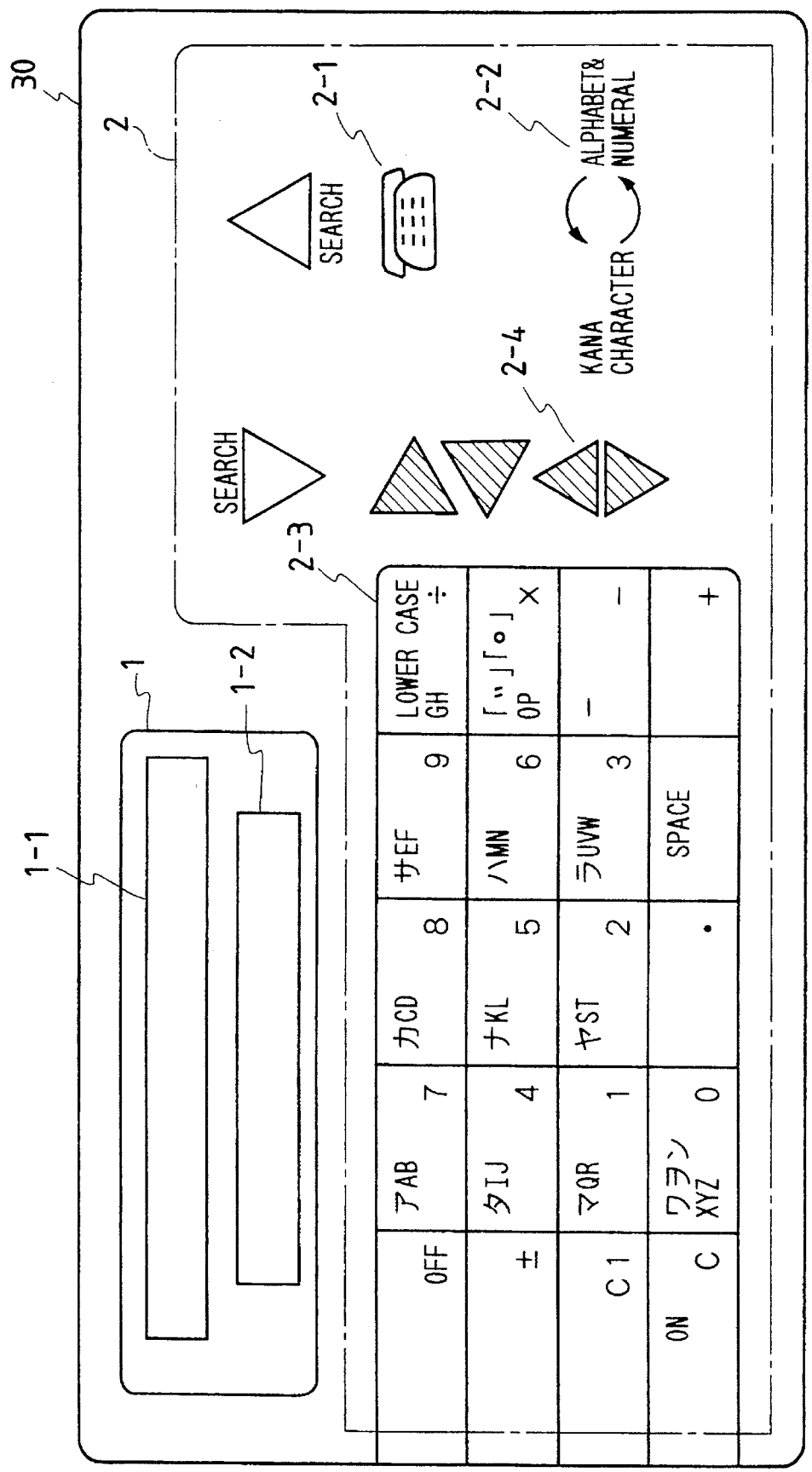
FIG. 4 is a plan view of an electronic data memorandum according to the first embodiment of the present invention.

In step S63, when a dial start key 2-1 shown in FIG. 4 is depressed and dial number transmission processing is discriminated, the instruction decoder 6 drives the LED 12 in accordance with call data used in step S67 (this data is stored in the RAM 4 and is telephone number data called onto the display section 1-2 in step S66). It is discriminated in step S68 whether all call processing data are transmitted. If NO ill step S68, the flow returns to step S67, and the next data is transmitted. The discrimination operation in step S68 is repeated until YES is obtained.

The instruction decoder 6 discriminates in step S69 whether character data (e.g., a destination name and a sender's name) is registered together with a telephone number. If NO in step S69, the flow returns to step S61. However, if YES in step S69, the character code is sent after a pause code of numeric data, and the character code is converted into a code in accordance with a correspondence shown in FIG. 7, thereby driving the LED 12. It is determined in step S71 whether all transmission data are transmitted. If NO in step S71, the flow returns to step S70, and the operation in step S71 is repeated until the next data is transmitted.

FIG. 1 is a view showing an outer appearance of a facsimile apparatus for receiving dial number data, destination data, and sender's data stored in the electronic data memorandum and for performing a call operation or adding data sentences to the data sent from the electronic data memorandum. The facsimile apparatus 35 has a recess 36 for positioning the electronic data memorandum 30. Dimple portions 36-1 and 36-2 are partially formed around the recess 36 to easily set or remove the electronic data memorandum 30 into or from the recess 36. A photoreception sensor unit 37 receives a light signal from the electronic data memorandum 30. A switch 38 is arranged to detect whether the electronic data memorandum 30 is set.

Figure 2:
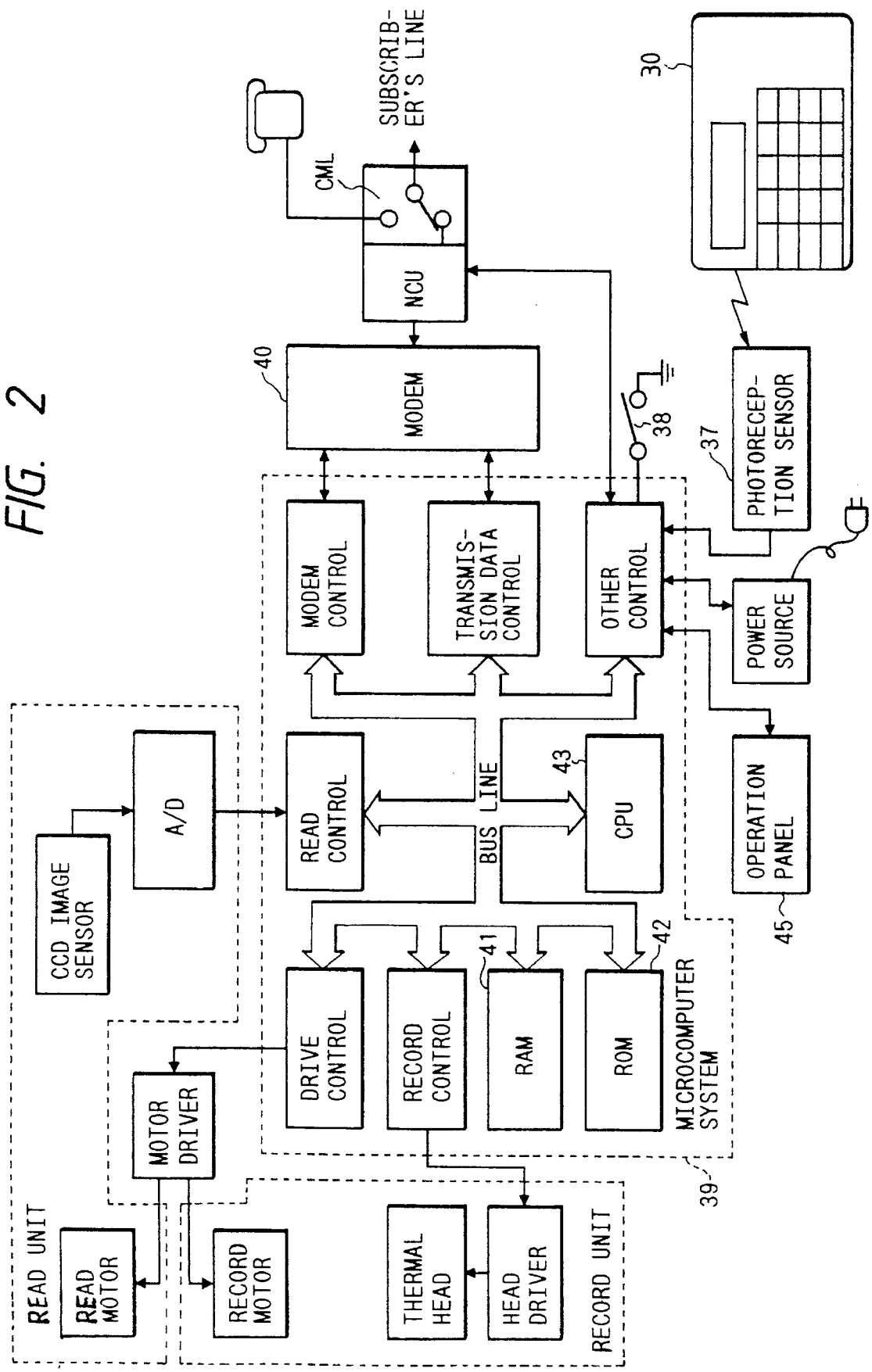
FIG. 2 is a block diagram of the facsimile apparatus according to the first embodiment of the present invention.

FIG. 2 is a block diagram showing facsimile functions. When the switch 38 detects that the electronic data memorandum 30 is set, a microcomputer system 39 causes the photoreception sensor 37 to photoelectrically convert a light signal from the electronic data memorandum 30. The microcomputer system 39 operates a modem 40 on the basis of the reception data and causes it to perform a call operation. The microcomputer system 39 demodulates coded destination name and sender's name data as bit images in a memory (RAM) 41 in accordance with character patterns stored in a memory (ROM) 42. The microcomputer system 39 stores image data input from a read unit in the RAM 41 and sends it through the modem 40.

Light detection is performed upon setting of the electronic data memorandum because an operation error occurs due to external light when the electronic data memorandum is not set.

Figure 8:
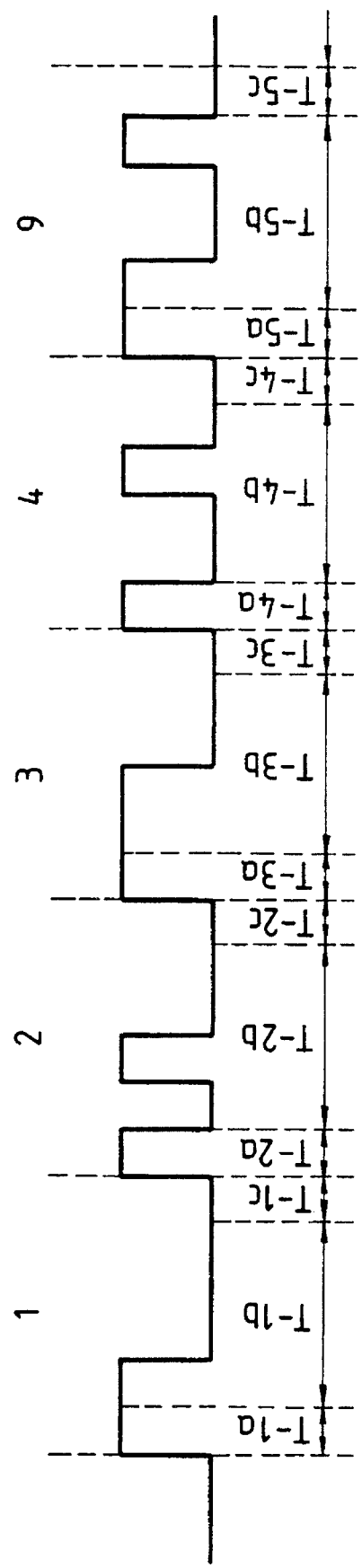
FIG. 8 is a signal chart of serial data according to the first embodiment of the present invention.

A signal sent out from the electronic data memorandum 30 is formatted into a data format like an RS-232C format. One dial number data or one decoded character data is sent out by a format "start bit+data bits (4 bits)+stop bit" in accordance with a start-stop synchronization scheme. This timing chart is shown in FIG. 8. One numeric data is sent by a start bit T-1a, data bits T-1b (data of "1"), and a stop bit T-1c. These bit data are followed by a start bit T-2a, data bits T-2b (data of "2"), and a stop bit T-2c. For example, dial number data "1", "2", "3", "4", and "9" are received.

FIG. 9 shows a conventional print-out result at a receiving side wherein transmission time and a sender's name are added to a message. More specifically, transmission date data 8-1, a destination name 8-2, a sender's name 8-3, and a page number 8-4 of the message are added and sent at the facsimile apparatus side and received at the receiving end. A message 8-5 input from a read unit and sent to the receiving end and a column 8-6 for a destination name and a sender's name for the message are handwritten by a sensor.

Figure 10:
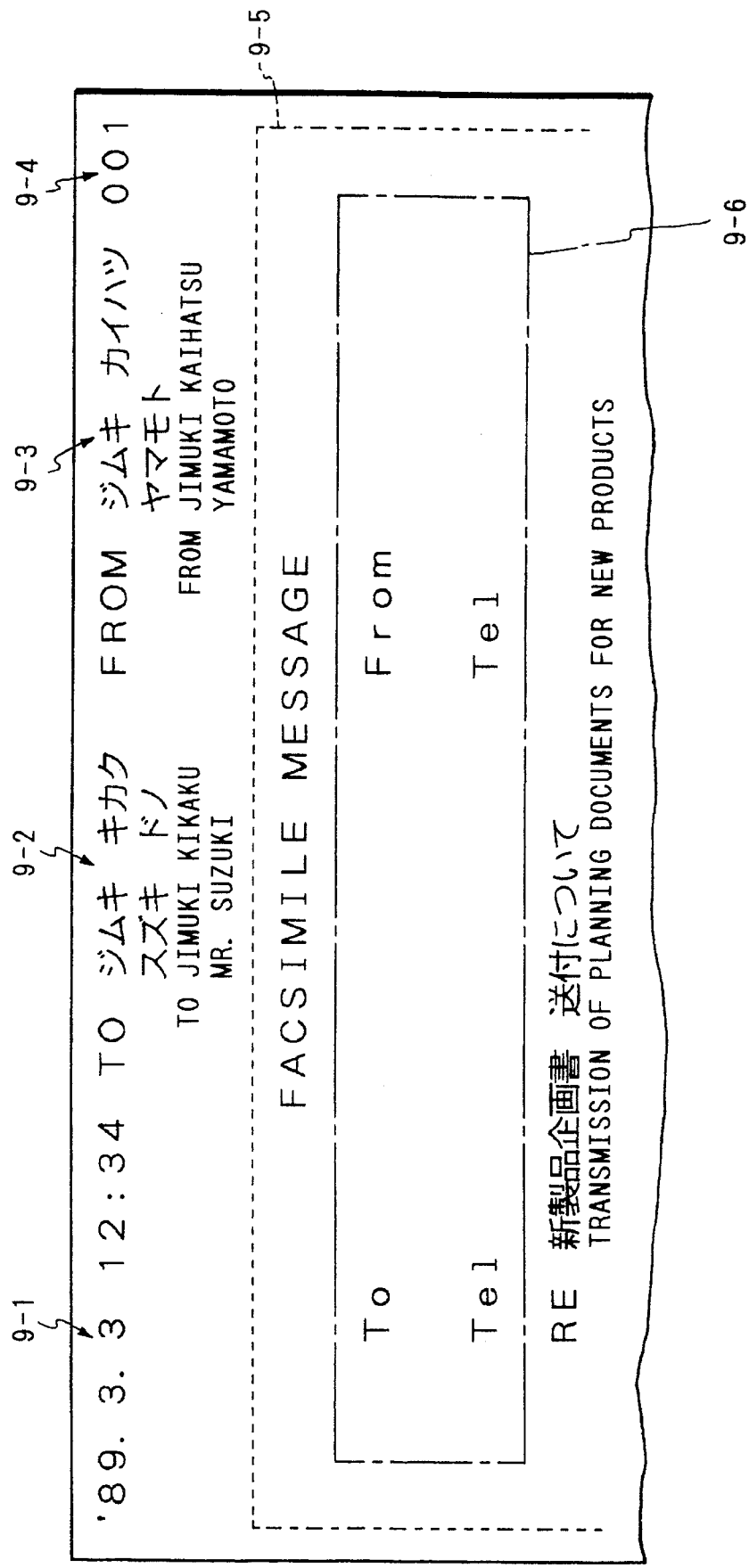
FIGS. 10 to 14 are views showing print-out results according to the first embodiment of the present invention, respectively.

FIG. 10 shows a print-out result received at the receiving end when information is sent through the facsimile apparatus of this embodiment. Transmission date data 9-1 which is stored in the source facsimile side is added to a message. As for destination name data 9-2 and sender's name data 9-3, when a message code (e.g., "#1#") is sent after dial number data from the electronic data memorandum 30, it is used as destination name data. When a message code (e.g., "#2#") and data are subsequently sent, these data are sent as the sender's name data in place of the sender's name data stored in the source facsimile apparatus. Page count data 9-4 for the message is generated by the source facsimile apparatus. A message 9-5 is input from a read unit. A column 9-6 for the destination name and the sendee's name need not be filled out.

Figure 3B:
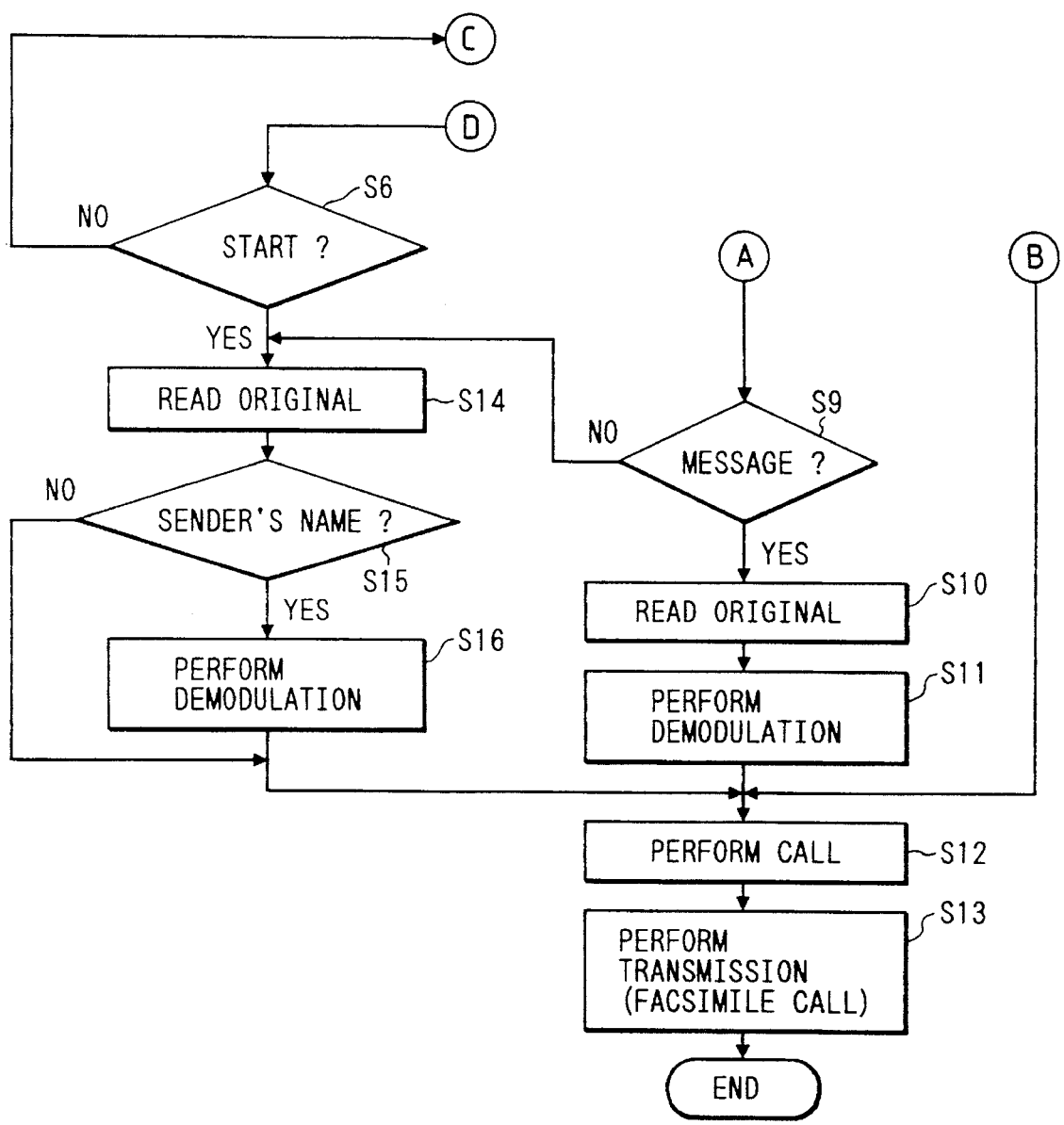
FIG. 3, consisting of FIGS. 3A and 3B, is a flow chart of the facsimile apparatus according to the first embodiment of the present invention.

FIG. 3 is a processing sequence of the first embodiment wherein a host machine (facsimile apparatus) in the system of this embodiment performs a call operation and adds a destination name by using data received from an electronic data memorandum. Step S1 represents a waiting state. In this state, a CPU 43 waits until a facsimile transmission original is set (step S2) or the electronic data memorandum (card) 30 is set (step S3). Whether a transmission original is set is determined by a CCD image sensor in the read unit. Whether the electronic data memorandum 30 is set is determined by the switch 38. When the CPU 43 detects in the discrimination step S2 that an original is set in a read unit, the original sheets are separated one by one, and the first original sheet is set at a predetermined position (step S4). The CPU 43 discriminates in steps S5 and S6 whether the card 30 is set (step S5) and whether a one-touch dial button on an operation panel 45 is operated to instruct transmission (step S6). The CPU 30 is then set in a waiting state. When the CPU 43 discriminates in step S2 that the transmission original data is stored in the RAM 41, the flow advances to step S5. When the card 30 is set, the switch 38 is turned on. The CPU 43 receives an ON signal from the switch 38, and YES is obtained in the discrimination step S5. The CPU 43 waits for data from the card 30 in step S7.

When the dial start key 2-1 in the card 30 is depressed and data is output, the output data is photoelectrically converted into a signal by the photoreception sensor 37. The converted signal is stored in the memory (RAM) 41 in step S8. The CPU 43 discriminates in step S9 whether the received data includes a message sentence, i.e., data following a message code (e.g., "#1#") is sent after the dial number data. If YES in step S9, the CPU 43 drives the read unit to fetch data of one original sheet or a few original sheets and stores the fetched data as a bit image in the memory (RAM) 41 in step S10. The message sentence such as the destination name data and the sender's name data is demodulated into a bit image by character patterns stored in the memory (ROM) 42, and the demodulated data is stored at the beginning of the image data input from a read unit 46 and stored in the memory (RAM) 41 (step S11). The modem 40 is driven by the dial number data stored in step S8 to perform a call operation (step S12). A message transmission operation (step S13) called a facsimile call is performed with a destination (callee), and the destination name and the sender's name from the card are added to the start of the FAX communication sentence.

According to a modification, if YES in step S9, the CPU 43 develops a character code received from the card 30 into a bit image and stores the bit image in the RAM 41. The CPU 43 performs a call operation and transmits the message sentence developed into the bit image. The CPU 43 them reads an original and transmits the read original image.

If NO in step S9, the flow jumps to step S14 in which a FAX communication sentence is read and the sentence is stored as a bit image in the RAM 41, as in step S1. The CPU 43 discriminates in step S15 whether data such as a sender's name is preset in the RAM 41 in the FAX main body. More specifically, the CPU 43 discriminates whether data representing the name of company and the name of department in which the facsimile apparatus is installed is input. If YES in step S15, data is demodulated into a bit image as in step S11 on the basis of the stored data and is inserted into the start of the image data stored in step S14 (step S16). Thereafter, the flow jumps to step S12, and the dial number data stored in step S8 is used to perform a call operation and message transmission processing (in this case, sender's name data is retrieved from that registered in the facsimile apparatus). The data such as sender's name data may be developed into a bit image, this bit image may be sent to the destination, and then the original may be read.

In this embodiment, if a message (i.e., a sender's name) is present is the data received from the card 30, this message is converted into a bit image and this bit image is transmitted. However, if no message is included in the data received from the card 30, a message (i.e., a name of company of a sender) is read out from the RAM 41, the readout data is converted into a bit image, and the converted bit image is transmitted to the destination. Even if no message is sent from the card 30, the message read out from the RAM 41 can be sent in place of the message from the card 30. That is, when no message is sent from the card 30, the facsimile apparatus 35 transmits the stored message and the read image. Otherwise, the facsimile apparatus 35 sends the read image together with an input message from the card 30.

If NO in step S2 and YES in step S3, i.e., when the card 30 is set, but a facsimile communication original is not set, the CPU 43 waits for processing data from the card 30 in step S17. When the CPU 43 receives data, it stores the received data in the memory (RAM) 41 in step S18. In step S19, the CPU 43 discriminates whether a message sentence is sent from the card 30. More specifically, the CPU 43 discriminates whether data (e.g., message sentences such as a communication sentence or a message memo sent after the message code #3#) except for the destination name data and the sender's name data is sent. If NO in step S19, no processing is performed, and the flow returns to step S1. However, if YES in step S19, the memorandum sentence is demodulated into a bit image together with the destination name data and the sender's name data, and the demodulated data is stored in the memory (RAM) 41 (step S20). A call operation is performed as in step S12 in accordance with dial number data stored in step S18. Therefore, a message (paperless message) without a facsimile transmission original can be transmitted.

Figure 11:
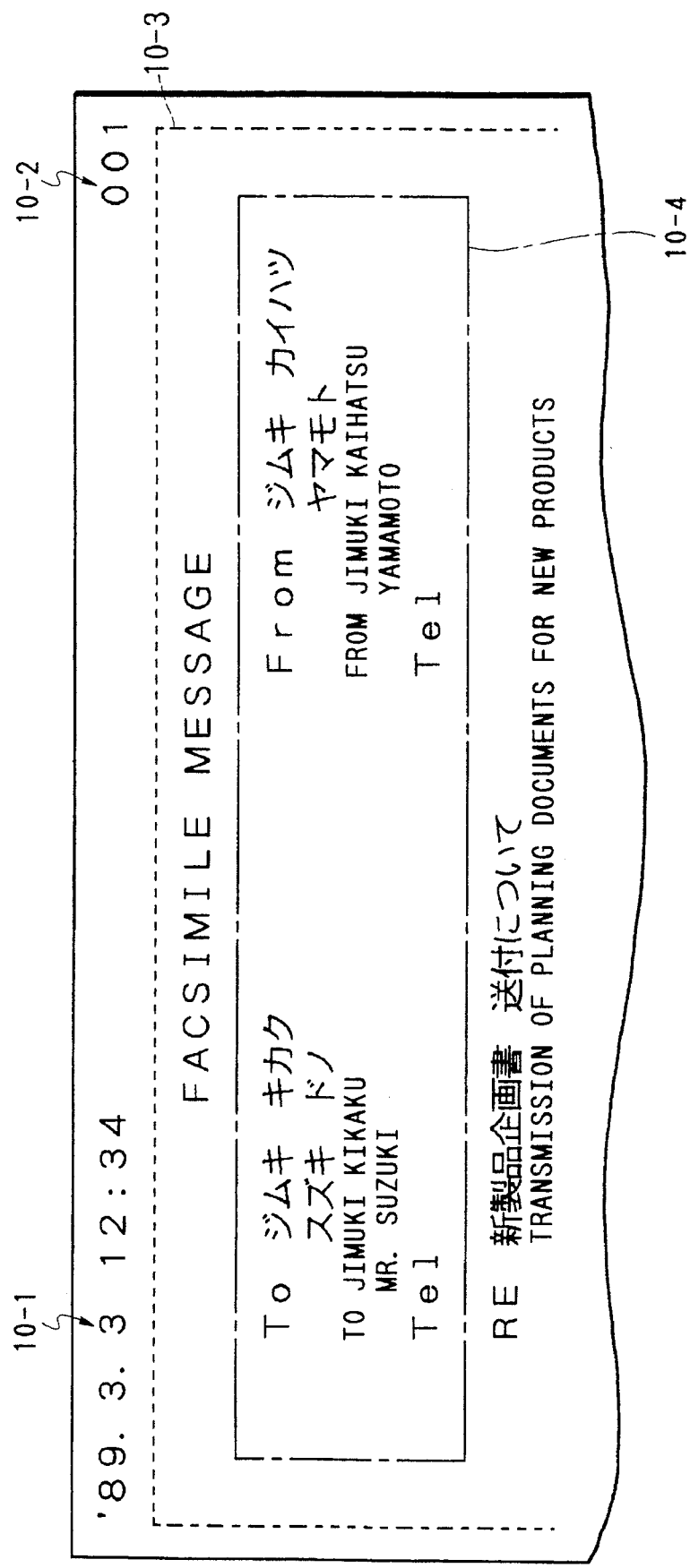

FIG. 11 shows another print-out result at the receiving end. This result includes transmission date data 10-1, message page count data 10-2 (the data 10-1 and 10-2 are generated by the source facsimile apparatus), message data 10-3 input from the read unit, and a column 10-4 for the destination name and the sender's name. In the source facsimile apparatus, the destination name data and the sender's name data from the electronic data memorandum 30 are demodulated into a bit image, and the bit image is written in this column together with an original image read by the read unit. For this reason, the sender need not fill out the column for the destination name and the sender's name.

Figure 12:
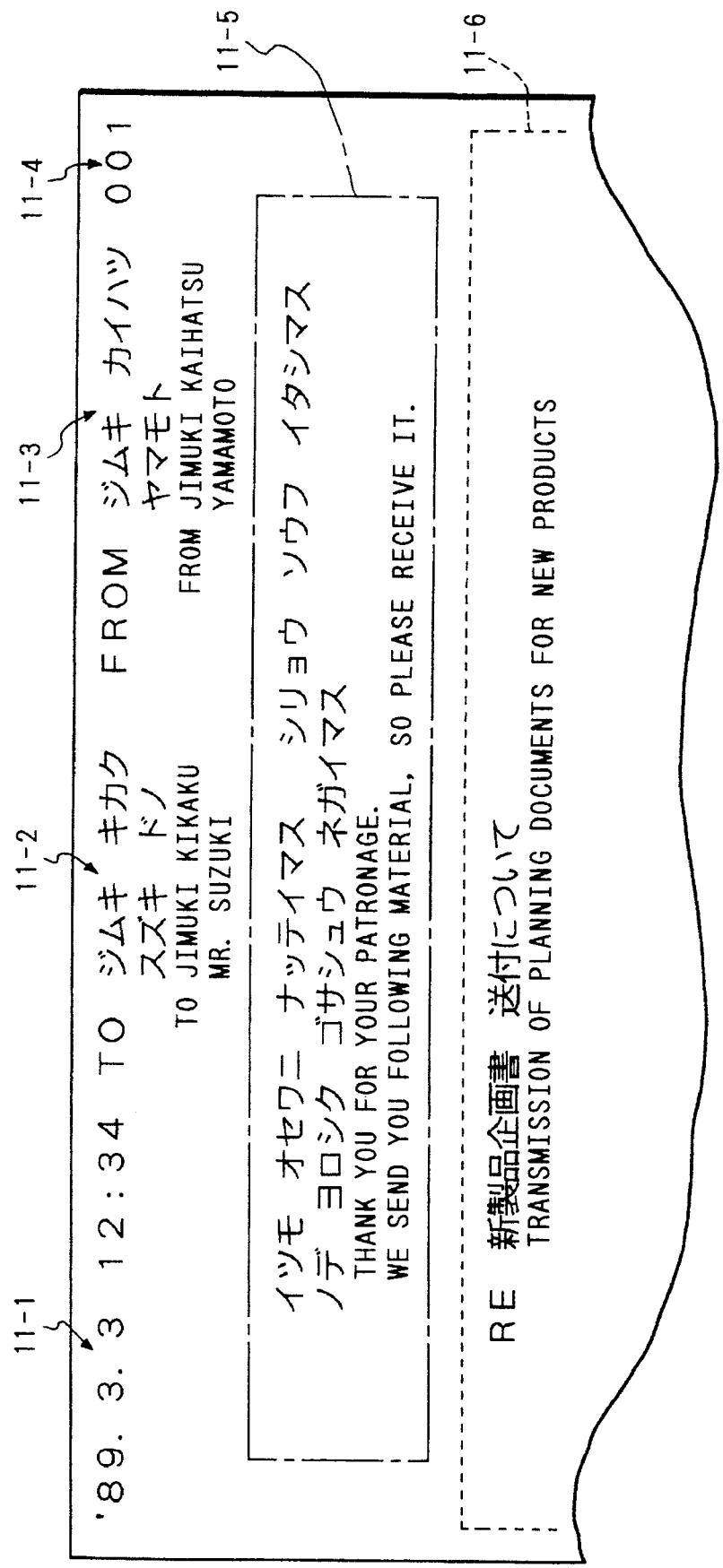

FIG. 12 is a view showing still another print-out result at the receiving end. This result includes transmission date data 11-1, message page count data 11-4 (the data 11-1 and 11-4 are generated by the source facsimile apparatus), and destination name data 11-2 and sender's name data 11-3 (the data 11-2 and 11-3 are sent from the electronic data memorandum). Stereotyped data 11-5 is prestored in the electronic data memorandum 30 and can be automatically (at the time of a call) sent after the destination name data and the sender's name data by the facsimile apparatus. A season's greeting or a facsimile communication greeting is demodulated together with the destination and sender's name data into a bit image, and the bit image is added to the start of a message sentence 11-6. Therefore, the head page in facsimile transmission need not be used to simplify office jobs. Image data having no space for writing the destination and sender's name data and the facsimile transmission greeting can be transmitted from the first page.

Figure 13:
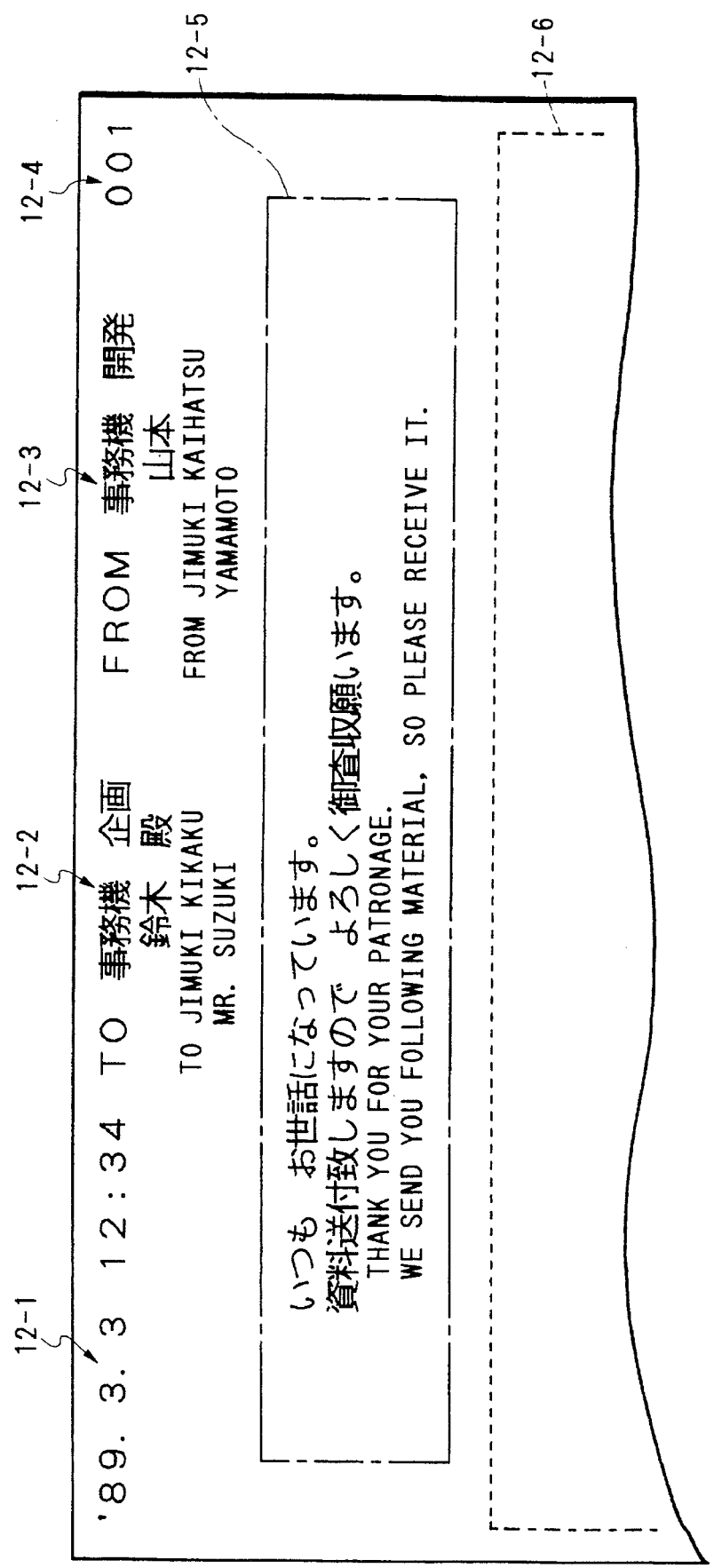

In this embodiment, since character data is received or transmitted on the basis of a code table shown in FIG. 7, a semi-fixed stereotyped sentence 11-5 is expressed in katakana characters. However, when the card 30 also sends kanji character codes and the facsimile apparatus 35 can convert kana or kanji characters into codes, readability of the sentence can be improved. As shown in FIG. 13, a print-out result includes transmission date data 12-1, destination name data 12-2, sender's name data 12-3, message page count data 12-4, stereotyped sentence data (semi-fixed stereotyped sentences) 12-5 input and stored in an electronic data memorandum in advance, and message data 12-6 input from a read unit.

Figure 14:
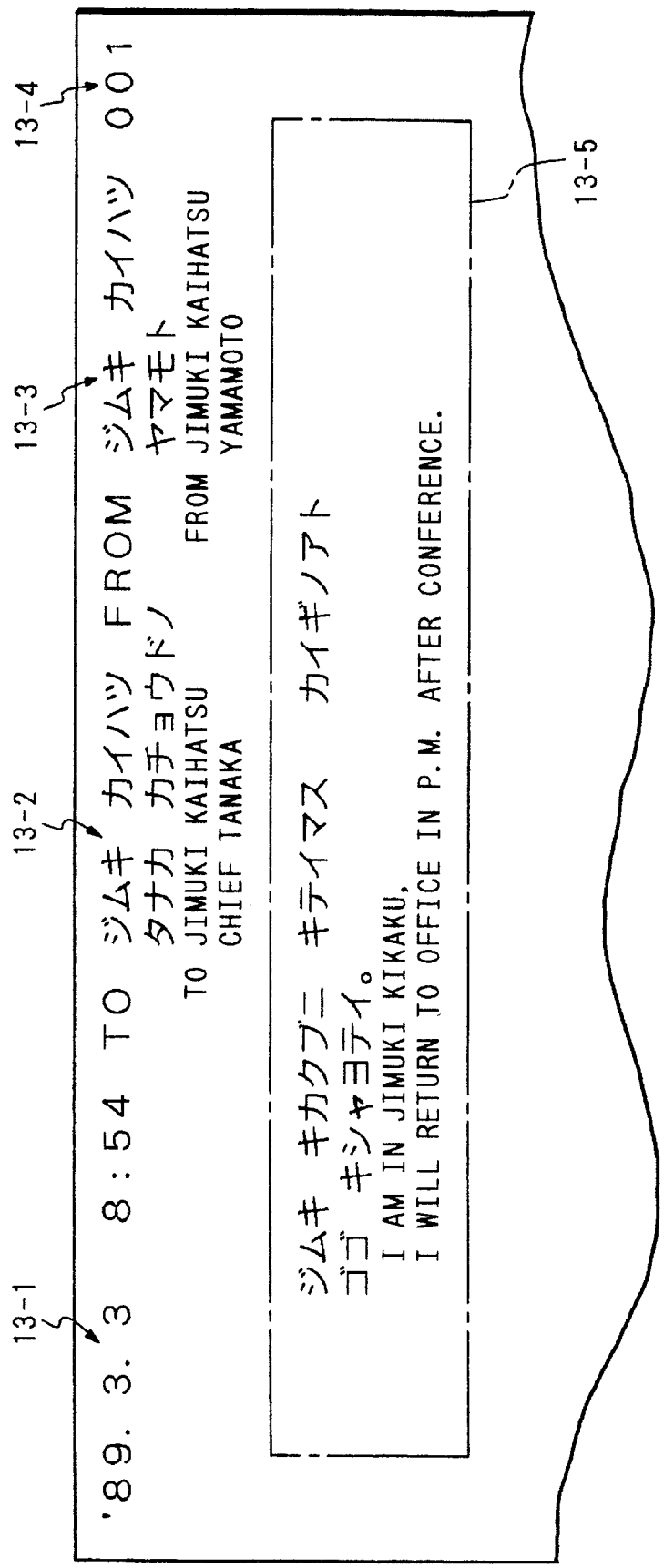

FIG. 14 is a view showing still another print-out result at a receiving end. This print-out result includes destination name data 13-2 and sender's name data 13-3. Data sent from the electronic data memorandum 30 are used in place of the destination and sender's name data registered in the facsimile apparatus. The print-out result also includes transmission date data 13-1, message page count data 13-4, and message sentence data 13-5 which is automatically (at the time of a call) sent after the destination name data and the sender's name data are sent. A simple message sentence of the message sentence data 13-5 input and stored in the electronic data memorandum 30 in advance can be sent as a facsimile message without requiring an original input and sent from a read unit.

In the system according to this embodiment, as described above, even if different users having different destinations to be frequently called share one facsimile apparatus, calls can be made using facsimile numbers (FAX Nos.) registered in the electronic data memorandums of the individual users. In addition, the destination and sender's names are not fixed ones registered in the facsimile apparatus but can be individual names registered in the electronic data memorandums. Therefore, the destination and sender's names need not be written at the beginning of each message sentence, thereby reducing the office work load.

A message from the electronic data memorandum can be transmitted without any message sentence written on a sheet scanned by the read unit. When a sender cannot get in contact with a destination because of a busy line although a very short message is to be sent, and when he must go out under the above situation, he impatiently tries to get in contact with the destination. In this case, a message sentence registered in the electronic data memorandum is input to the facsimile apparatus. Alternatively, some stereotyped message sentences are registered in the RAM 4 in the electronic data memorandum, a necessary message is selected using the keyboard 2, and the selected message is reserved and sent by the facsimile apparatus. The destination and sender's names and a desired message need not be handwritten on a sheet, and therefore a quick contact can be achieved. Since the facsimile apparatus often has a redial function for redialing the destination when the line is busy, a sender's message can be sent to the destination with higher probability. In addition, when a sender leaves a message to a third party, the third party may forget to transmit the sender's message. This can be prevented by the above operation. Therefore, a very convenient system can be designed.

In the above embodiment, transmission date data and the like stored in the facsimile apparatus are transmitted to the callee or destination. However, the electronic data memory may have a timepiece function, and the timepiece data together with the destination name data and the like can be transmitted.

The electronic data memorandum may be mechanically connected to the host machine through a connector to perform facsimile communication. In this embodiment, however, signal exchange can be achieved by optical coupling, and therefore mechanical trouble caused by repeated use of the connector (e.g., incomplete contact, wear, cluttering, and dust attachment) and bending or damage of connector pins caused by erroneous insertion of the connector can be prevented to provide a highly reliable signal exchange system.

In this embodiment, serial communication can be performed by a pair of an LED and a photosensor. However, parallel communication may be performed by using a plurality of pairs of LEDs and photosensors. This may apply to subsequent embodiments.

In this embodiment, both the dial number and the message data are received from the data memorandum. However, a dial number may be input from the operation unit 45, and a message may be input from the data memorandum. This may apply to subsequent embodiments.

Second Embodiment

Figure 15B:
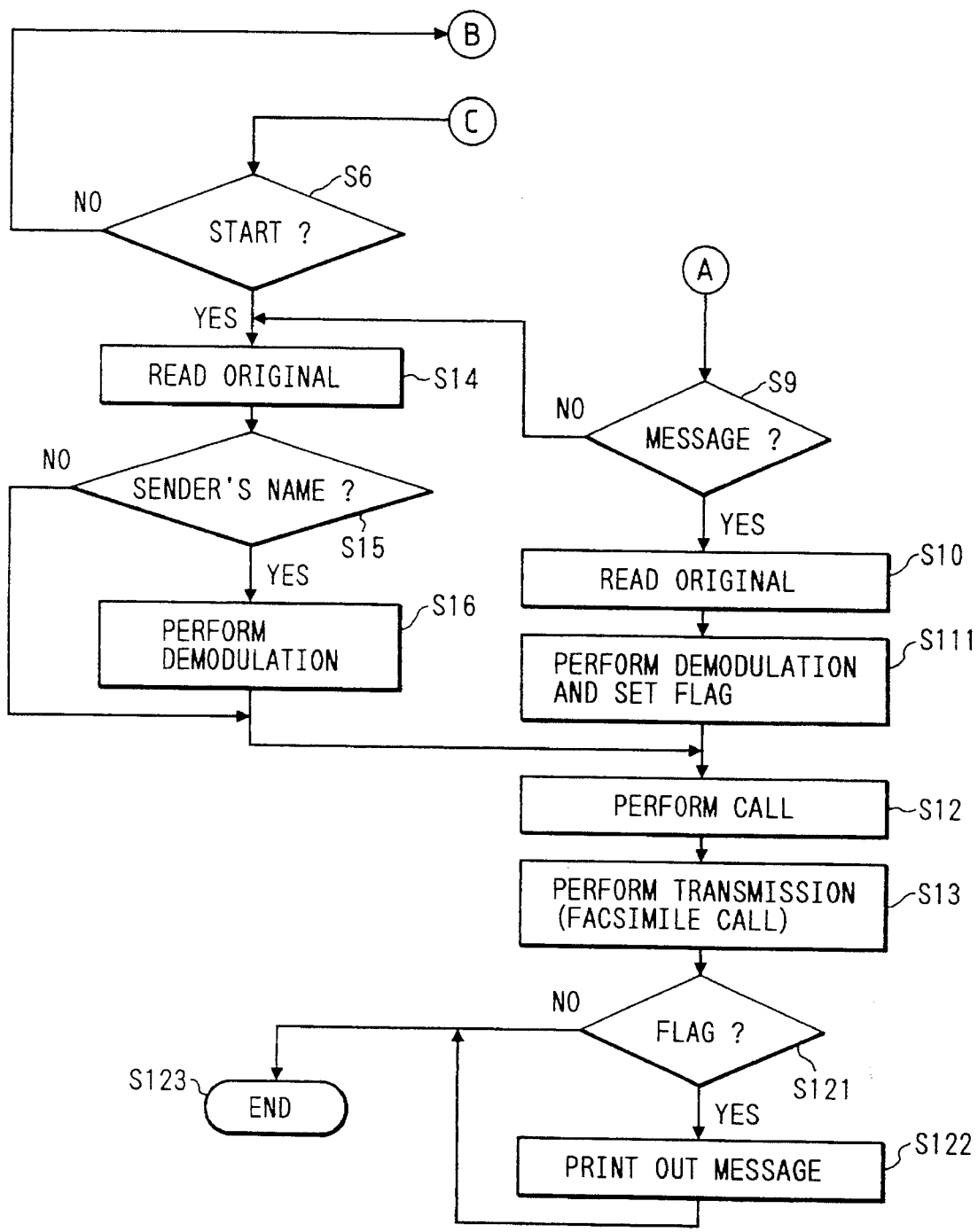
FIG. 15, consisting of FIGS. 15A and 15B, is a flow chart of a facsimile apparatus according to the second embodiment of the present invention.

In addition to the processing sequence of the first embodiment, the second embodiment exemplifies a print-out operation for printing out a duplicate at the transmitting end. The arrangements of an electronic data memorandum (card) 30 and a facsimile machine 35 are the same as those in FIGS. 5 and 2. A processing sequence of the second embodiment is shown in FIG. 15. The operations in steps S1 to S10 in FIG. 15 are the same as in FIG. 3. After a message sentence is stored in a RAM 41, a flag is set in step S111 to print out this message in a subsequent step. A modem 40 is driven by dial number data stored in step S8 to perform a call operation (step S12) to perform message transmission (step S13) called a facsimile call to a destination (callee). A destination name and a sender's name from the card are added to the beginning of the FAX communication sentence, and the resultant data are sent to the destination.

Figure 16:
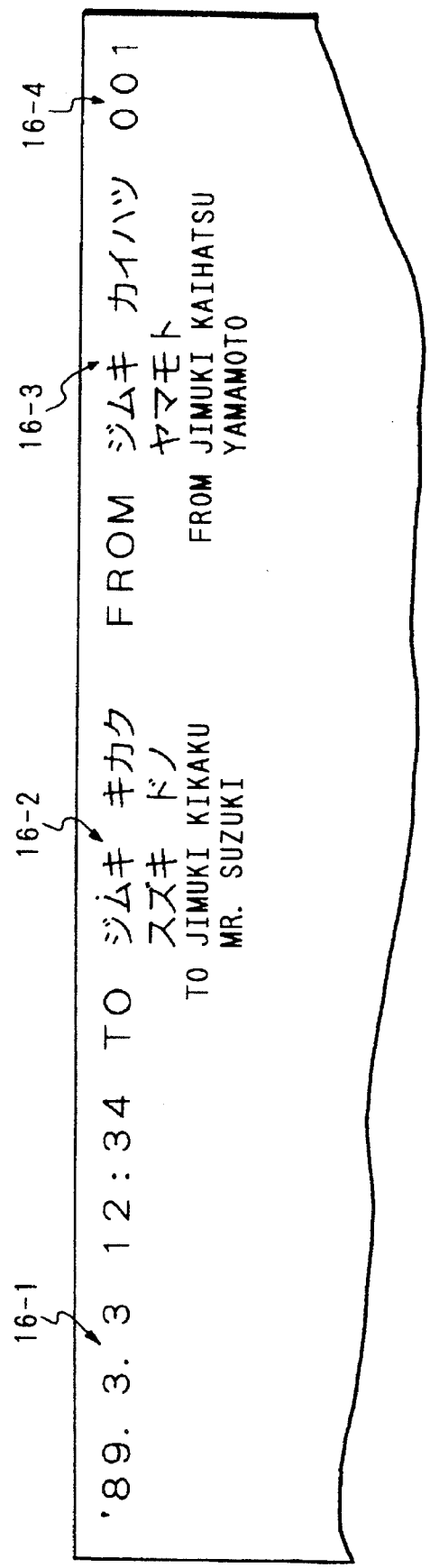
FIG. 16 is a view showing a print-out result according to the second embodiment of the present invention.

A CPU 43 discriminates in step S121 whether the flag set in step S111 is kept set. If YES in step S121, the destination and sender's name data from the card 30 are printed out (step S122), as shown in FIG. 16, and the flow is ended (step S123). However, if NO in step S121, the communication is ended (step S123).

If NO in step S9, the flow jumps to step S14 in which a FAX transmission original is read and the read image is stored in the RAM 41 as a bit image, as in step S10. The CPU 43 discriminates in step S15 whether the sender's name data and the like are preset in the facsimile apparatus. More specifically, the CPU 43 discriminates in this step whether data such as a name of company and a name of a department at which the facsimile apparatus is installed are preset in the RAM 41 in the facsimile apparatus. If YES in step S15, these data are demodulated into a bit image, and this bit image is stored at the beginning of the image data obtained in step S14 (step S16). The flow then jumps to step S12, and a call operation is made using the dial number data stored in step S8, and a message (in this case, the sender's name data is stored in the facsimile apparatus itself and is added to the message) is transmitted.

If NO in step S2 and YES in step S3, i.e., when the card 30 is set, but an original is not set in the facsimile apparatus, the CPU 43 waits for data from the card in step S17. Upon reception of the data from the card 30, the input data is stored in the memory (RAM) 41 (step S118). The CPU 43 waits in step S119 until a FAX original is set. When an original is set, the flow returns to step S4, and the same operations as described above are performed.

The CPU 43 waits in step S120 until a FAX original is set although the data is not sent from the card 30 in step S17. When an original is set, the flow returns to step S4, and the same operations as described above are performed.

The CPU 43 waits in steps S119 and S120 until a FAX original is set. However, if no FAX communication sentence is set within a predetermined period of time after steps S119 and S120, an alarm tone or message may be generated.

A report is output when a communication error occurs due to a busy line or the like on the callee side.

FIG. 16 shows data received from the electronic data memorandum 30 and printed out at the transmitting facsimile apparatus in this embodiment. The print-out result includes transmission date data 16-1, destination name data 16-2, sender's name data 16-3, and message page count data 16-4.

As described above, according to the system of this embodiment, in addition to the effects of the first embodiment, since the data (e.g., destination name data and sender's name data) which are output from the electronic data memorandum and are not handwritten before the message sentences can be printed out at the transmitting end. When the print-out result is preserved together with the message sentence input from the read unit, the destination can be specified although the designation name is not written on the original, thus resulting in convenience.

In order to allow an operator to check character data such as a facsimile number and a name registered in the card 30, the facsimile apparatus 35 is set at an operation unit 45 in the copy mode, and the data is transmitted from the card 30 to the facsimile apparatus. In the copy mode, the CPU 43 prints out the input data at the printer upon reception of data from a photoreception sensor 37.

Character synthesis of a copying machine is available as an application of character print-out. This operation can be performed by transmitting character data to a copying machine having a light-receiving element from the card 30. Upon reception of this character data, the copying machine synthesizes the received character data with an original image on an original table and prints out the synthesized image.

Third Embodiment

In addition to the processing sequence of the first embodiment, the third embodiment exemplifies an operation for enlarging or reducing the sizes of destination and sender's name data to match with a size of a blank portion of the column for the destination and sender's name data at the beginning of a sheet for facsimile transmission sentences, and for synthesizing the enlarged or reduced data with an image. The arrangements of an electronic data memorandum (card) 30 and a facsimile apparatus 35 are the same as those in FIGS. 5 and 2.

In this arrangement, in accordance with character patterns stored in a memory (ROM) 42, a CPU 43 in the facsimile apparatus 35 demodulates destination and sender's name data codes into a bit image, and stores the bit image data in a memory (RAM) 41. The CPU 43 discriminates whether a predetermined blank area (an area in which nothing is written) is present at the beginning of the memory (RAM) 41 which stores the image data input from the read unit, i.e., at the beginning of the first original sheet. If the predetermined blank portion is present, the destination and sender's name data from the electronic data memorandum are demodulated into a bit image, and this bit image is written in the blank memory area. However, if the predetermined blank area is not present, the read image is transmitted after the data from the electronic data memorandum is transmitted.

The transmission data is sent out through a modem 40.

Figure 18:
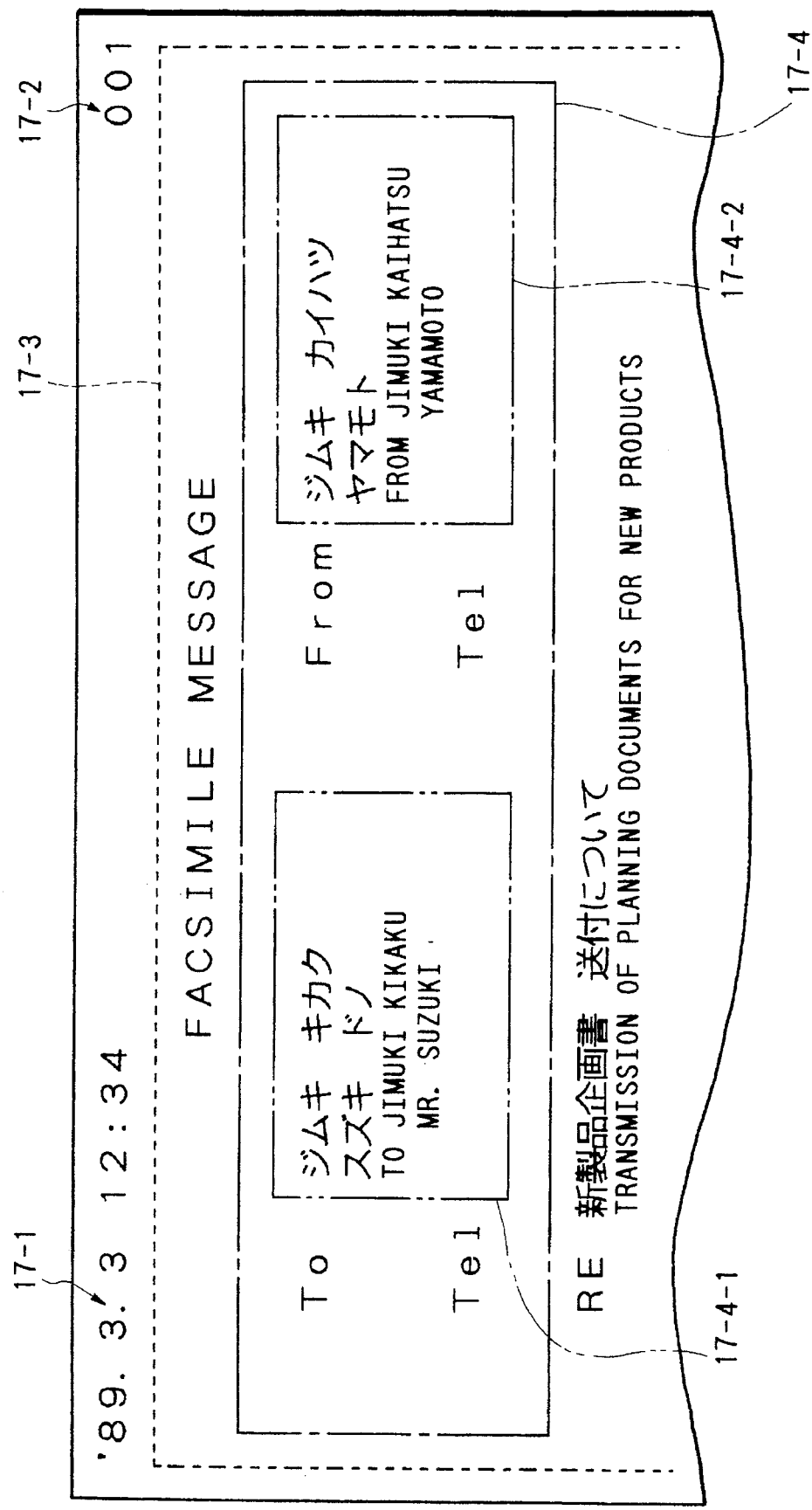

FIG. 18 shows a print-out result at a receiving end when information is sent through the facsimile apparatus of this embodiment. The print-out result includes transmission date data 17-1, message page count data 17-2, both of which are generated by the source facsimile apparatus, a message 17-3 input and sent from the read unit, and a destination and sender's name column 17-4. The data from the electronic data memorandum 30 are printed out in a destination name area 17-4-1 and a sender's name area 17-4-2. In the source facsimile apparatus, the CPU 43 uses data sent from the electronic data memorandum 30 as destination name data when this data is sent together with a message code (e.g., "#1#") after the dial number data from the electronic data memorandum 30. When another message code (e.g., "#2#") and another data are subsequently sent from the electronic data memorandum 30, these data are written as the sender's name in a blank area upon its detection in place of the sender's name stored in the facsimile apparatus.

Figure 19:
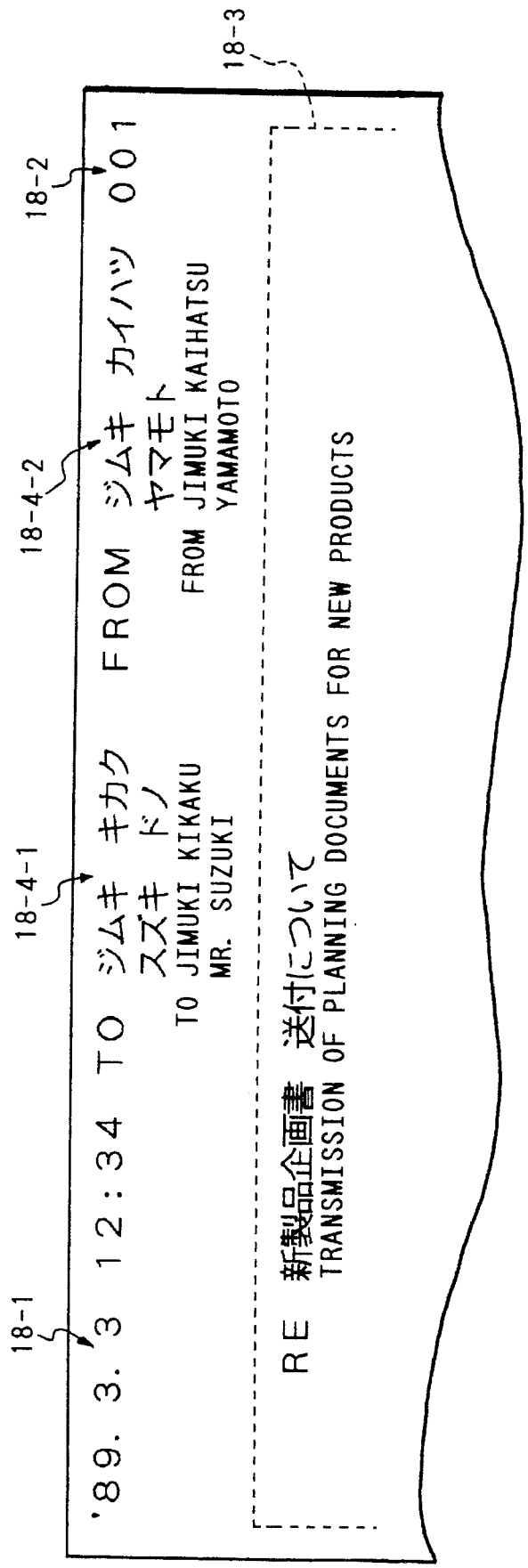

FIG. 19 shows a print-out result at a destination facsimile apparatus when a blank area is not present at a predetermined position of the message input from the read unit and destination and sender's name data from the electronic data memorandum 30 are added and transmitted prior to transmission of the message. The print-out result includes transmission date data 18-1, message page count data 18-2, both of which are generated by the source facsimile apparatus, and a message 18-3 read and input from the read unit. Destination name data 18-4-1 and sender's name data 18-4-2 sent from the electronic data memorandum are printed out in place of the corresponding data stored in the facsimile apparatus.

Figure 17B:
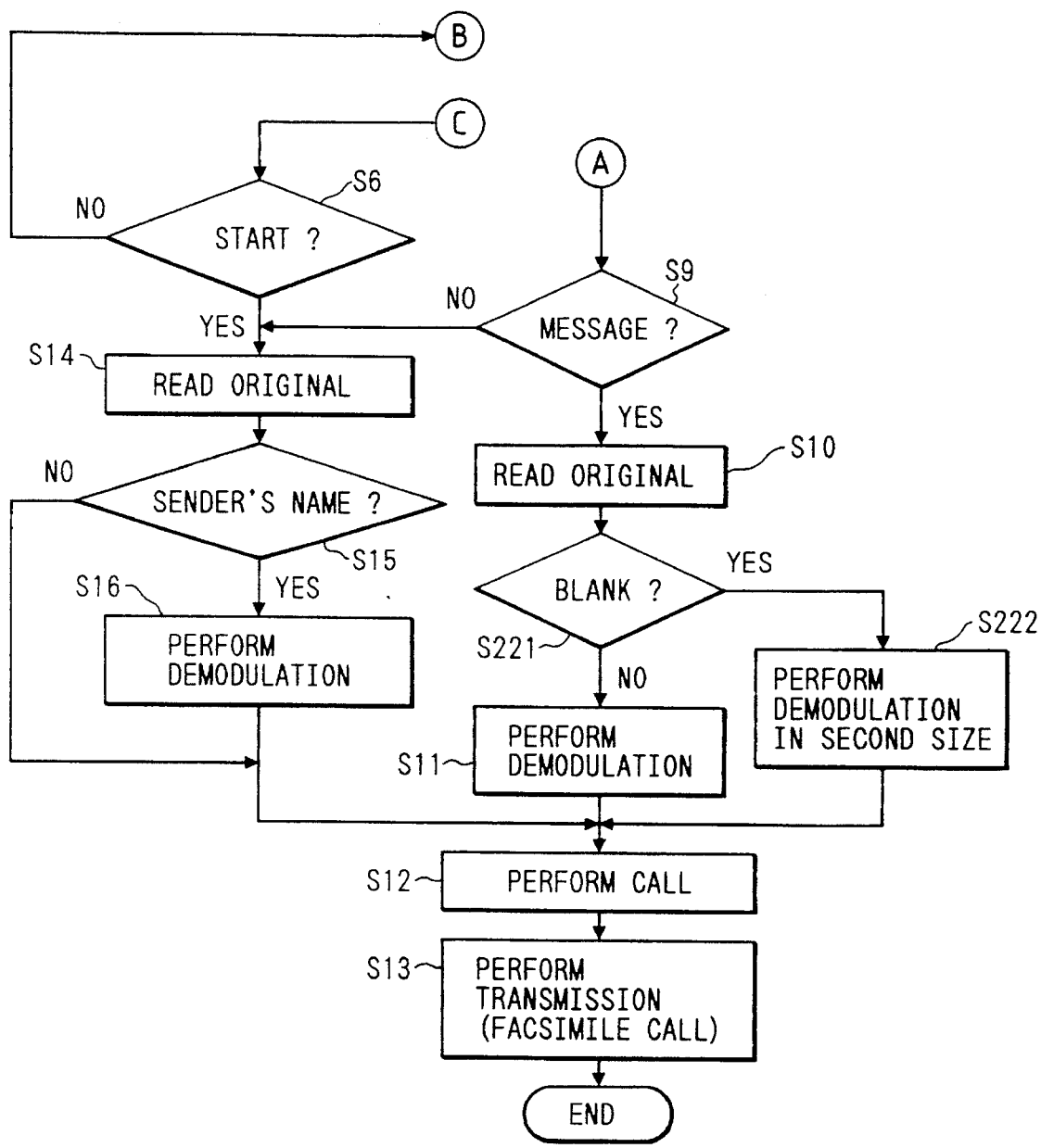
FIG. 17, consisting of FIGS. 17A and 17B, is a flow chart of a facsimile apparatus according to the third embodiment of the present invention.

A processing sequence of this embodiment is shown in FIG. 17. The operations in steps S1 to S10 in FIG. 17 are the same as those in FIG. 3. In step S10, the CPU 43 fetches data of the first FAX original sheet or a few FAX original sheets from the read unit and stores the input data in the form of a bit image in the memory (RAM) 41 (step S10). The CPU 43 then discriminates in step S221 whether a predetermined blank portion is present at the beginning of the stored image data, i.e., the start portion of the first FAX original sheet. This discrimination operation is performed such that the CPU 43 checks contents of a predetermined area of the RAM 41.

If NO in step S221, the CPU 43 demodulates a message sentence such as the destination and sender's name data in accordance with a first character pattern stored in the memory (ROM) 42, and stores the demodulates data in front of the transmission original image data of the memory (RAM) 41 (step S11). However, if YES in step S221, the destination and sender's name data are demodulated by a second character pattern representing a character size larger than that represented by the first character pattern. The demodulated data is written in the predetermined blank portion of the image data stored in the memory (RAM) 41 (step S222).

The subsequent operations from step S12 are the same as those of the previous embodiment, and a detailed description thereof will be omitted.

Figure 20:
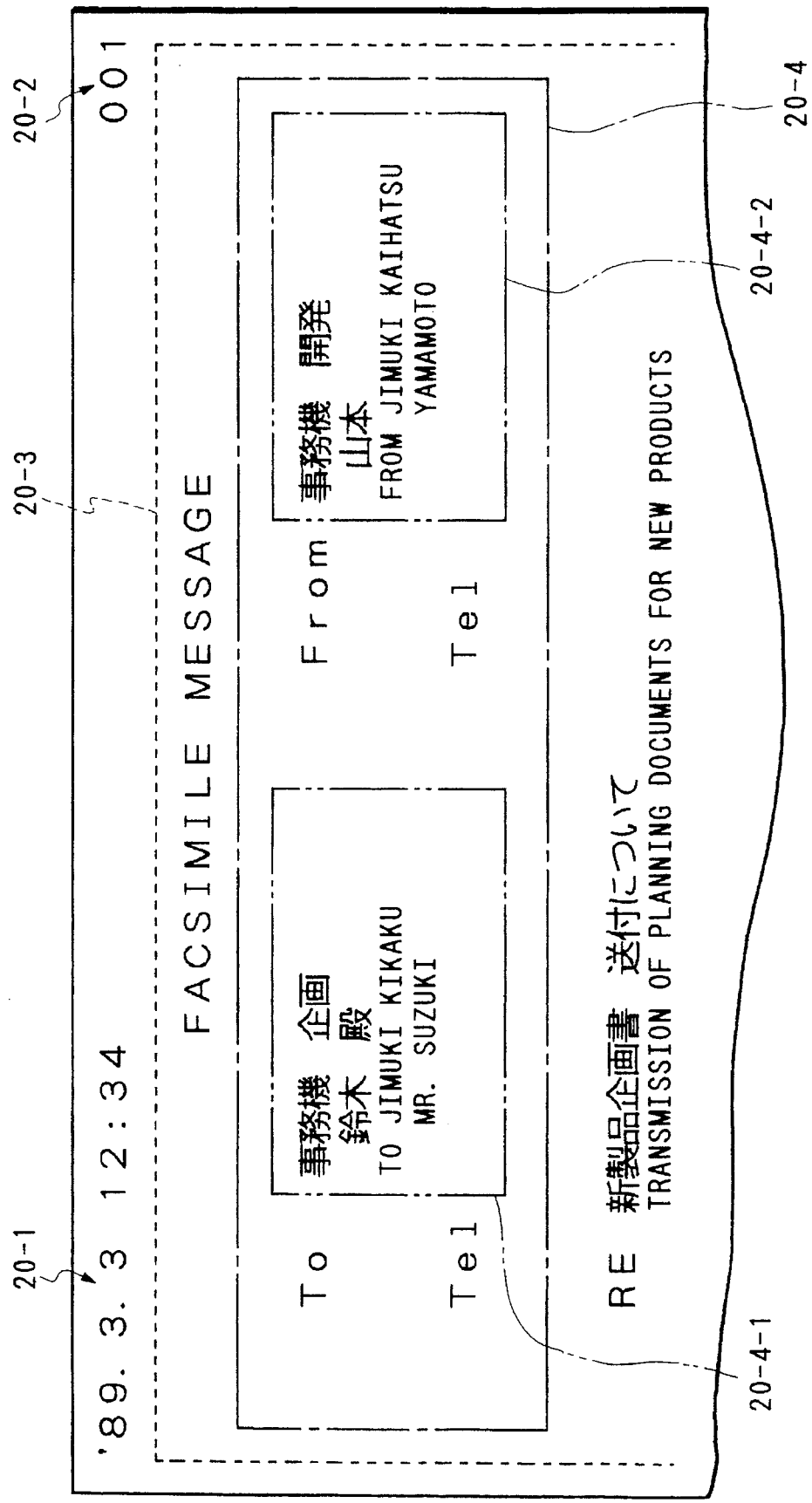

As shown in FIG. 20, when the CPU 43 converts kana and kanji characters into codes, a print-out result which is easy to read is obtained at the receiving end. This print-out result includes transmission date data 20-1, message page count data 20-2, a message 20-3 input and sent from the read unit, a destination and sender's name column 20-4, destination name data 20-4-1 added and transmitted in kanji characters, and sender's name data 20-4-2 added and transmitted in kanji characters.

FIG. 21 shows a print-out result at a source facsimile apparatus wherein transmission data (print-out data at the destination side) shown in FIG. 18 is printed out at the source facsimile apparatus. The print-out result includes transmission date data 21-1, message page count data 21-2, destination name data 21-3-1, and sender's name data 21-3-2. The CPU 43 prints out data of a predetermined area from the beginning of the image stored in the memory (RAM) 41 to a position where the destination and sender's name data are demodulated.

FIG. 22 shows a print-out result at a destination facsimile apparatus wherein the source facsimile apparatus 35 discriminates a size of a predetermined blank area, character sizes of destination and sender's name data from the electronic data memorandum are changed, and the resultant data are transmitted to the destination facsimile apparatus. The print-out result includes transmission date data 22-1, message page count data 22-2, a message 22-3 input from the read unit, and a destination and sender's name column 22-4. The destination and sender's name data are added and transmitted in a size corresponding to the blank area size.

In this case, different character size patterns, e.g., large and small character sizes, or large, medium, and small character sizes, are stored in the memory (ROM) 42. The CPU 43 calculates a character area required when a large character size pattern for the character counts of the destination and sender's name data sent from the electronic data memorandum 30 is used. The CPU 43 then compares the calculated character area with the blank area detected from the input message. If the blank area is larger than the calculated character area, the CPU 43 demodulates the characters into a bit image in accordance with the large character size pattern. To the contrary, when the blank area is smaller than the calculated character area, a character area required when the input data is demodulated with a medium character size is calculated. The CPU 43 compares the blank area with the calculated medium character size. A series of comparison operations are sequentially performed to determine the best character size for the character pattern.

When the blank area is compared with the necessary character area and if the necessary area is larger than the blank area even with the smallest character size stored in the ROM, the CPU 43 causes the destination facsimile apparatus to print out the destination and sender's names prior to print-out of the message input from the read unit, as shown in FIG. 19.

In this embodiment, since the character size can be automatically determined, a sheet except for a predetermined facsimile transmission sheet can be used if an appropriate blank is formed without using the facsimile transmission sheet, thereby providing a very convenient system.

Fourth Embodiment

Figure 23:
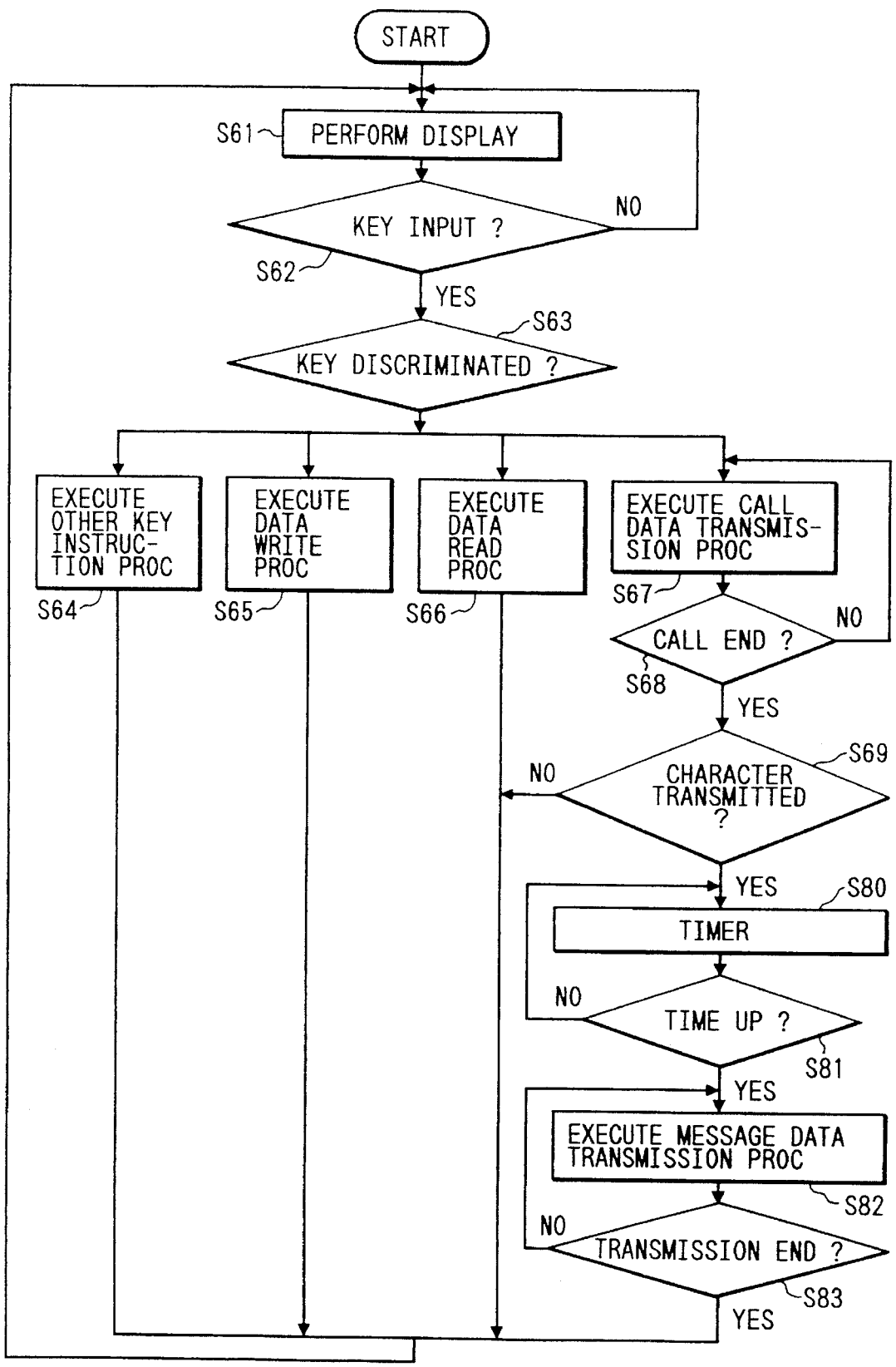
FIG. 23 is a flow chart of an electronic card memorandum according to the fourth embodiment of the present invention.

A processing sequence of an electronic data memorandum 30 in this embodiment is shown in FIG. 23. The electronic data memorandum 30 and a facsimile apparatus 35 in the fourth embodiment are identical to those in FIGS. 5 and 2. The operations in steps S61 to S69 in FIG. 23 are the same as those in FIG. 6. After an instruction decoder 6 drives an LED 12 in accordance with a telephone number (step S68), the instruction decoder 6 discriminates whether character data is registered in a RAM 4 in correspondence with this telephone number (step S69). If NO in step S69, the flow returns to step S61. However, if YES in step S69, the instruction decoder 6 turns on a timer in the RAM 4 (step S80). A timer time is set to be a period enough to cause the destination facsimile apparatus to respond to a call. When the time set in the internal timer elapses (step S81), the instruction decoder 6 drives the LED 12 in accordance with character data (step S82). The operation in step S82 continues until all data are transmitted (step S83).

The facsimile apparatus having the arrangement shown in FIG. 2 photoelectrically converts a light signal sent from a photoreception sensor 37 and representing a dial number sent from the electronic data memorandum 30, and performs a call operation through a modem 40. After a period required to engage the telephone line elapses, data such as destination and sender's name data are transmitted from the electronic data memorandum 30 as light signals. A CPU 43 develops data detected by the photoreception sensor 37 into a bit image and stores the bit image in a RAM 41. The stored data is coded, and the coded data is transmitted onto the telephone line through the modem 40.

Fifth Embodiment

The fifth embodiment is a modified embodiment of the fourth embodiment. In the fifth embodiment, an R/S signal output circuit 44 is added to the arrangement of the fourth embodiment. The R/S signal output circuit 44 comprises an LED for outputting an R/S signal for instructing retransmission of message data to an electronic data memorandum 30 and a drive circuit for the LED when message data is sent from the electronic data memorandum 30 and the source facsimile apparatus fails to receive this message data during calling of a callee with dial number data sent from the electronic data memorandum 30 or during a busy line state. In this case, a timing at which the R/S signal is sent to cause the electronic data memorandum 30 to resend the message is a timing at which the source facsimile apparatus is connected to a destination (callee) facsimile apparatus. However, the message from the electronic data memorandum 30 may be received during the wait time until redialing is performed after a lapse of a predetermined period of time and may be temporarily stored in a memory (RAM) 41. In this case, the temporarily stored data is transmitted when the source facsimile apparatus is connected to the destination facsimile apparatus.

Figure 24:
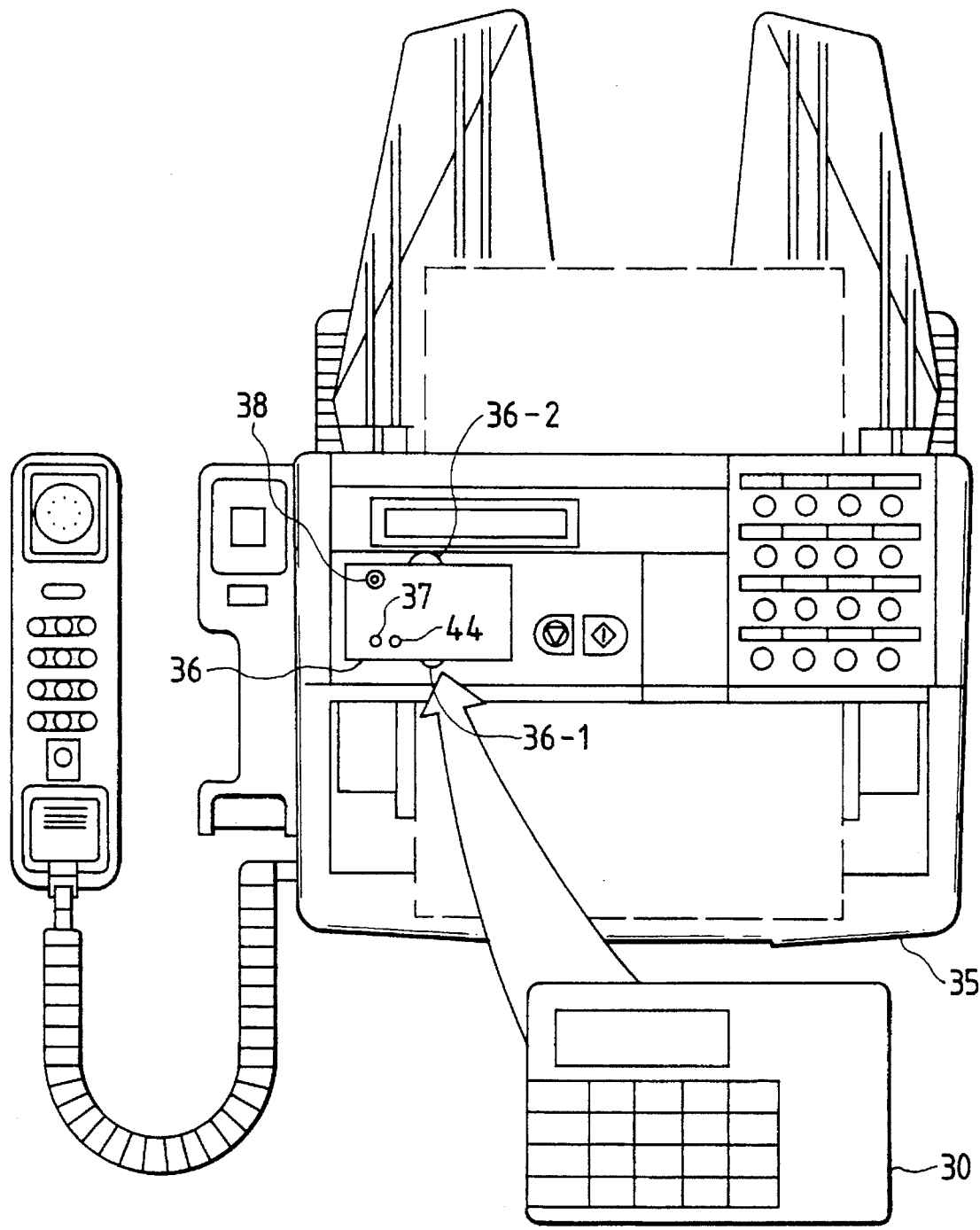
FIG. 24 is a plan view showing a facsimile apparatus according to the fifth embodiment of the present invention.

FIG. 24 shows an outer appearance of the facsimile apparatus in which the R/S signal output circuit 44 is arranged in addition to the arrangement shown in FIG. 1.

Figure 26:
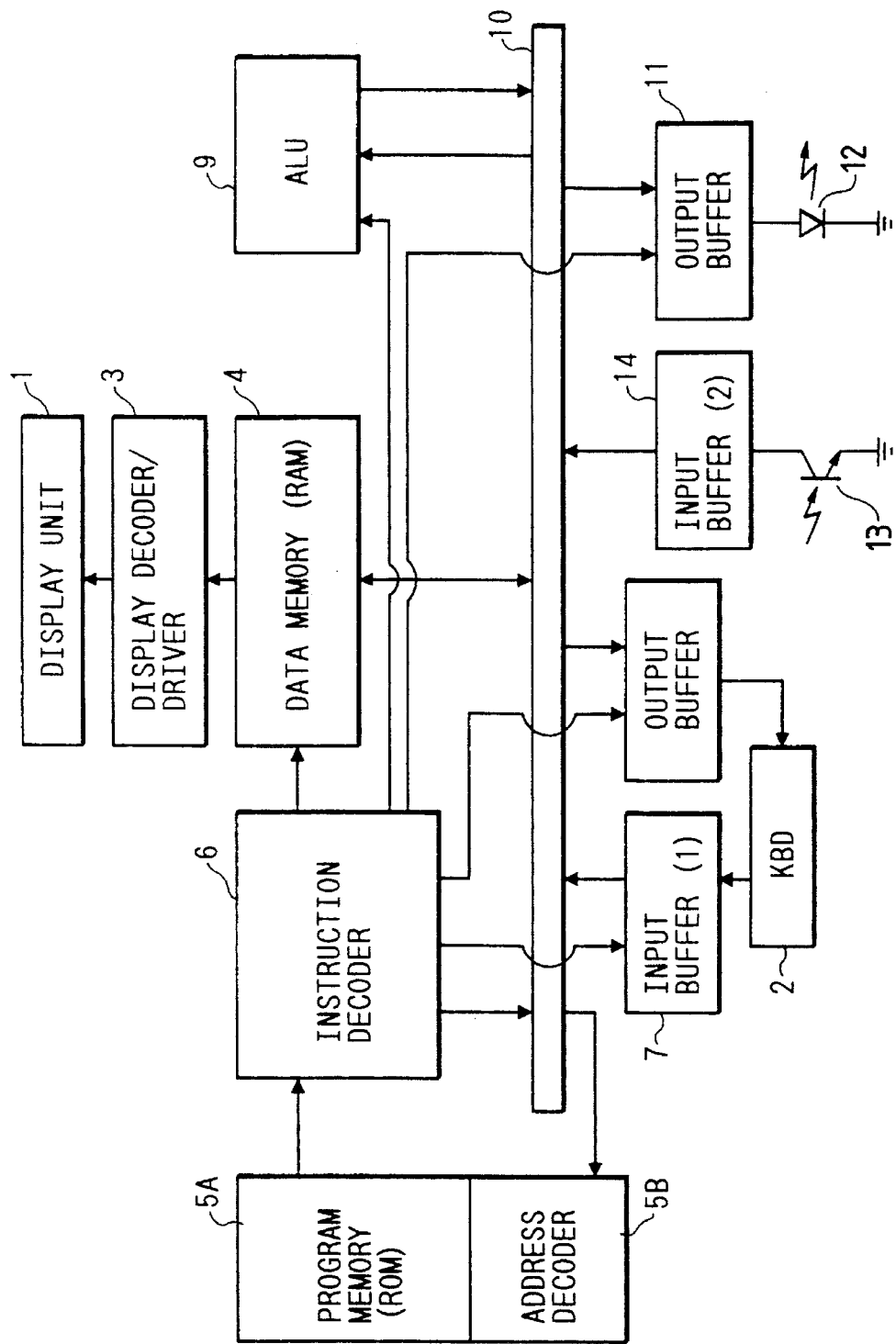
FIG. 26 is a block diagram of an electronic data memorandum according to the fifth embodiment of the present invention.

FIG. 26 is a block diagram of an electronic data memorandum which further includes an input unit for receiving the R/S signal. That is, a light-receiving element 13 and an input buffer (2) 14 are added to the arrangement shown in FIG. 5.

Figure 27:
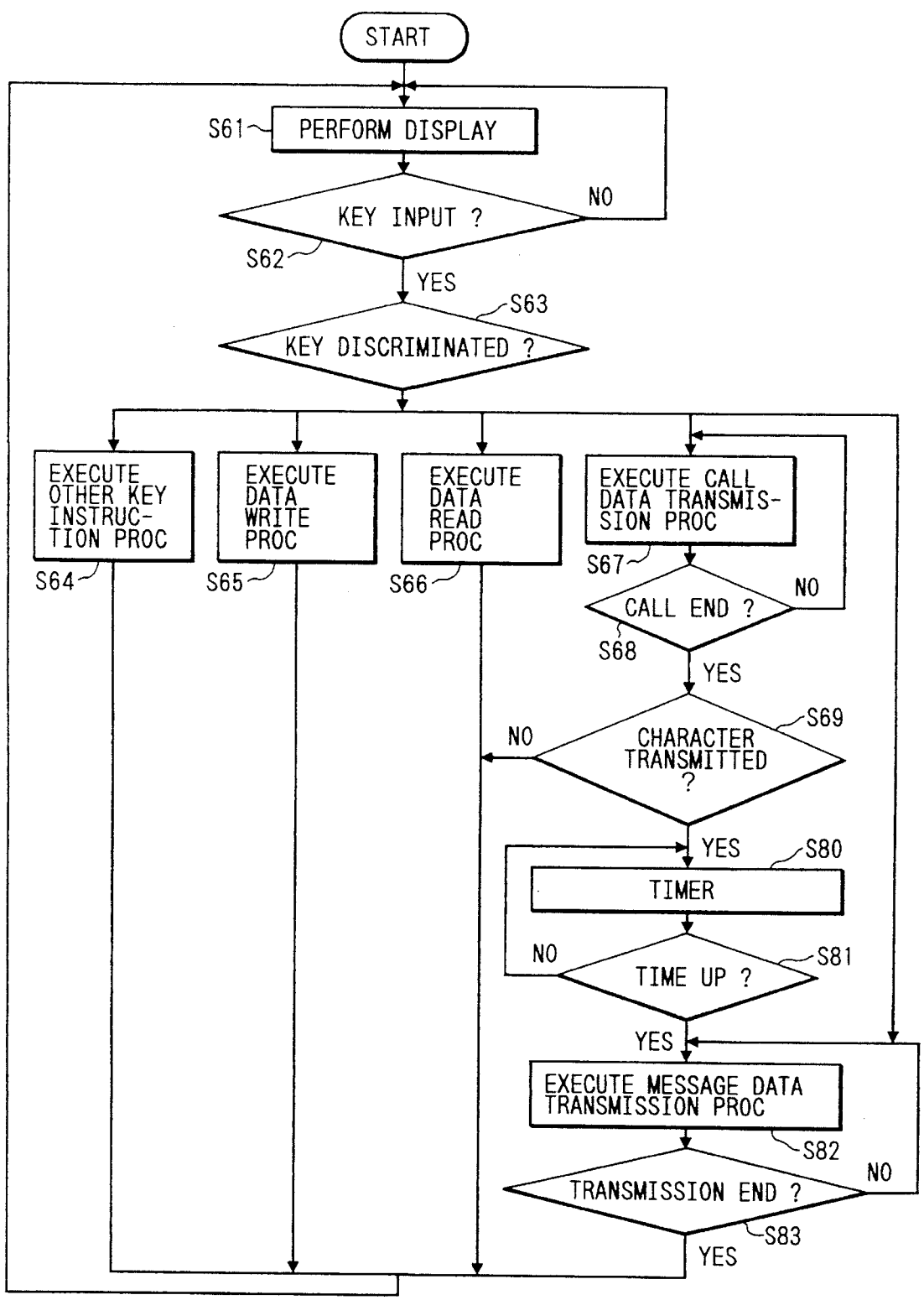
FIG. 27 is a flow chart of the electronic data memorandum according to the fifth embodiment of the present invention.

FIG. 27 is a flow chart showing a processing sequence of the electronic data memorandum 30. In addition to the processing described with reference to FIG. 6, in step S62, an instruction decoder 6 also discriminates states of an input buffer (1) (7 in FIG. 26) and the input buffer (2) (14 in FIG. 26). When a signal from the input buffer (2) 14 is detected in step S63, the flow advances to step S82 to transmit character data.

More specifically, when a call is instructed, the electronic data memorandum 30 transmits a telephone number and sends a message after a lapse of a predetermined period of time. When a facsimile apparatus 35 fails to receive the message, it sends an R/S signal to the electronic data memorandum 30. The electronic data memorandum 30 causes the input buffer (2) 14 to detect this R/S signal (step S63) and sends the message again.

A processing sequence of the electronic data memorandum which allows retransmission when a line is busy can be provided as follows. Inputs to the key input buffer (1) 7 and the key input buffer (2) 14 are detected in step S62 t6 discriminate the key inputs in FIG. 23. When the input, i.e., the R/S signal, from the key input buffer (2) 14 is detected in step S63, the flow advances to step S67. Redial transmission processing (step S67), wait processing for a predetermined period of time (step S80), and message data transmission (step S83) can be performed. That is, in this case, when the card 30 receives the R/S signal, it transmits the dial number again. When the facsimile apparatus 35 fails to receive the data from the card 30, a call operation is started from the beginning.

According to this embodiment, as described above, when the facsimile apparatus fails to utilize the data from the card 30, it can request retransmission of the data, thereby improving utilization efficiency of the data from the card 30. This effect is not limited to the facsimile apparatus but can be obtained by a portable computer using a card having the same arrangement as the card 30.

Sixth Embodiment

In this embodiment, a facsimile apparatus 35 receives a telephone number from an electronic data memorandum 30 and performs a call operation. Upon detection of engagement with a called station, telephone line engagement is signaled to the electronic data memorandum 30. Upon detection of the telephone line engagement, the electronic data memorandum 30 sends a message as a code to be transmitted from the facsimile apparatus 35 to the facsimile apparatus 35. Upon reception of this code, the facsimile apparatus 35 develops this code into a bit image and transmits coded data.

Figure 25:
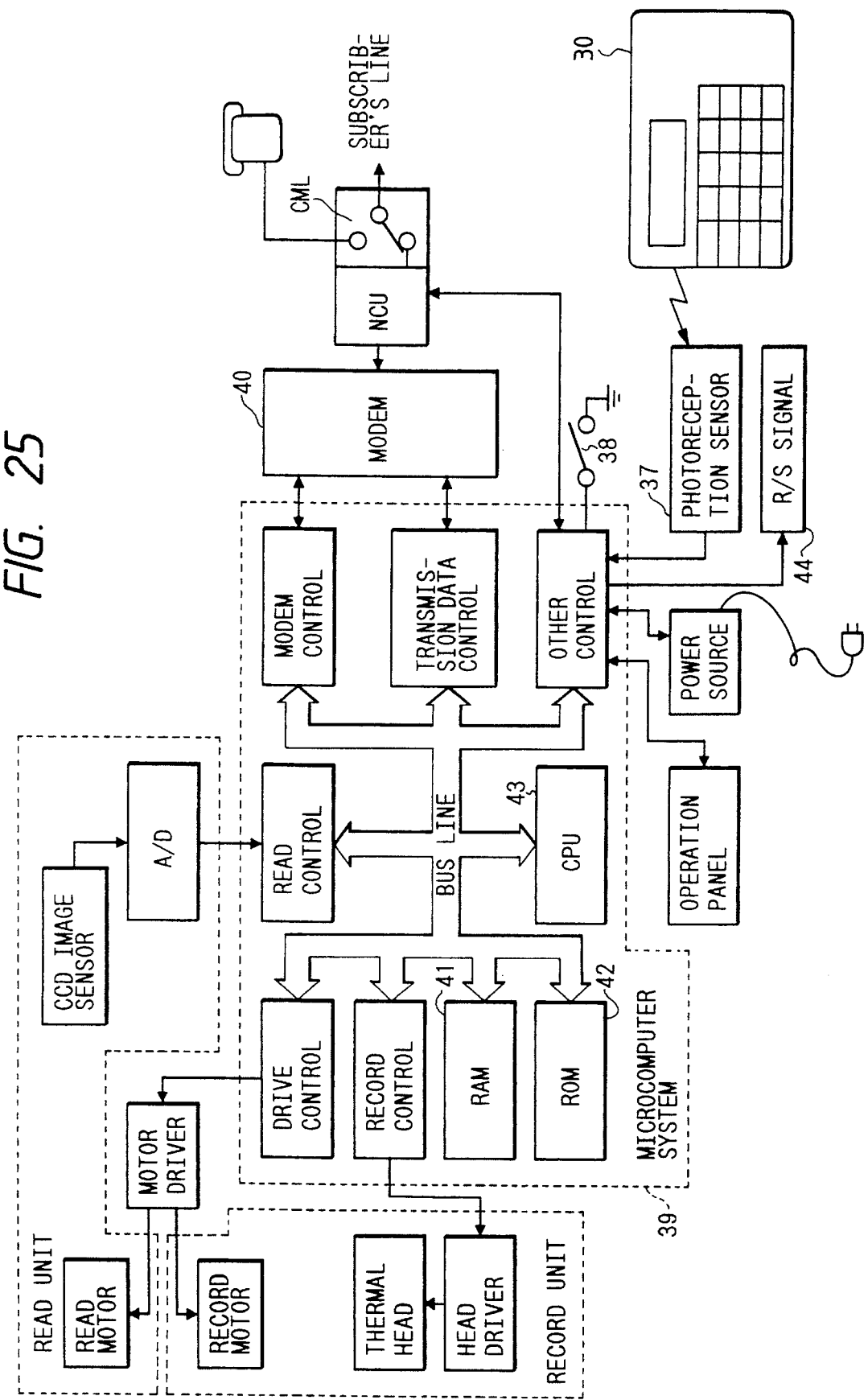
FIG. 25 is a block diagram of the facsimile apparatus according to the fifth embodiment of the present invention.
Figure 28:
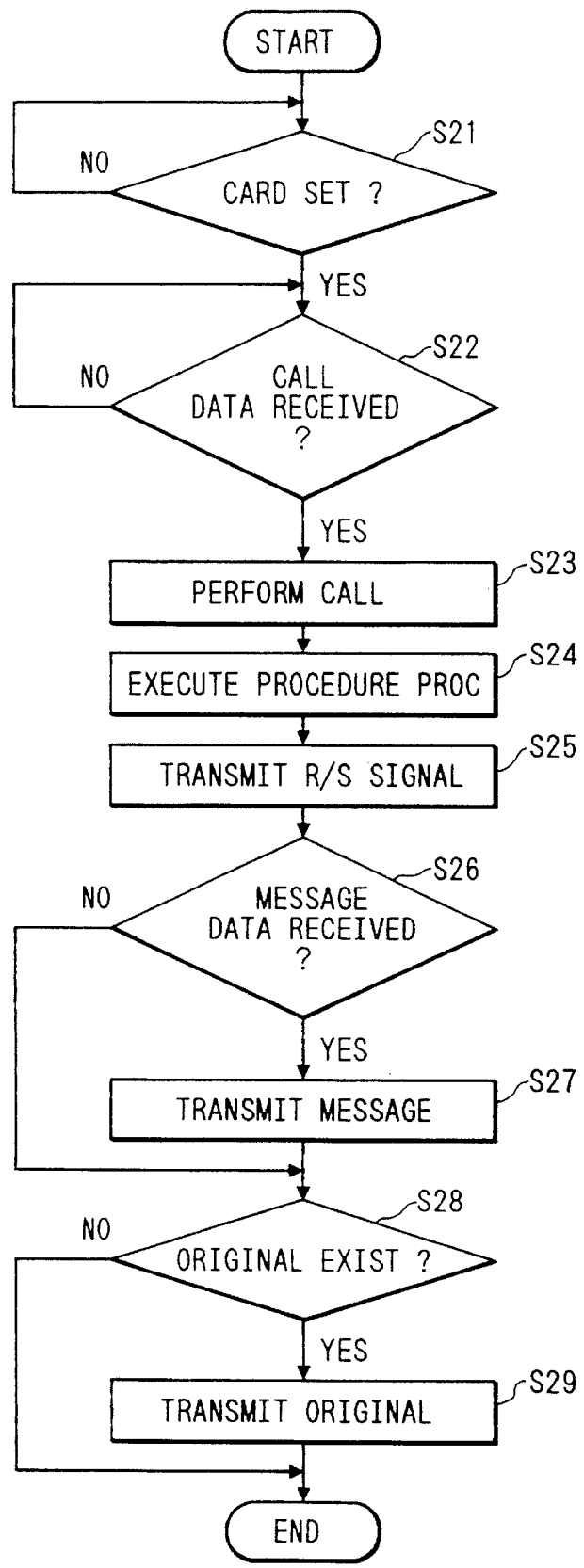
FIG. 28 is a flow chart of a facsimile apparatus according to the sixth embodiment of the present invention.

The arrangement of the facsimile apparatus 35 is identical to that in FIG. 25, and a processing sequence of the facsimile apparatus 35 is shown in FIG. 28. A microcomputer system 39 detects from an input from a switch 38 that the electronic data memorandum 30 is set (step S21). The microcomputer system 39 causes a photoreception sensor 37 to photoelectrically convert a light signal (dial No. data) sent from the electronic data memorandum 30 (step S22). The microcomputer system 39 controls the operation of a modem 40 on the basis of the reception data and causes it to perform a call operation (step S23). When telephone line engagement with the callee is detected by an NCU (Network Control Unit) or CPU 43 for detecting polarity inversion of the telephone line), the CPU 43 performs destination and facsimile transmission operations (step S24). The CPU 43 then causes the R/S signal output circuit 44 to output the R/S signal (step S25).

Upon reception of the R/S signal, the electronic data memorandum 30 sends the designation and sender's name data and the like, and the CPU 43 receives these data (step S26) and stores them in a memory (RAM) 41. The data stored in the RAM 41 is demodulated into a bit image therein (in another area where the data from the electronic data memorandum is stored) in accordance with a character pattern stored in a memory (ROM) 42, thereby obtaining image data. The image data is coded by the facsimile apparatus, and the coded data is sent onto the telephone line (step S27).

Further, if an original sheet to be sent exists in the read unit (step S28), the image data is also stored in the RAM 41 and then sent through the modem 40 following the sending of the image data from the electronic data memorandum 30 (step S29).

Figure 29:
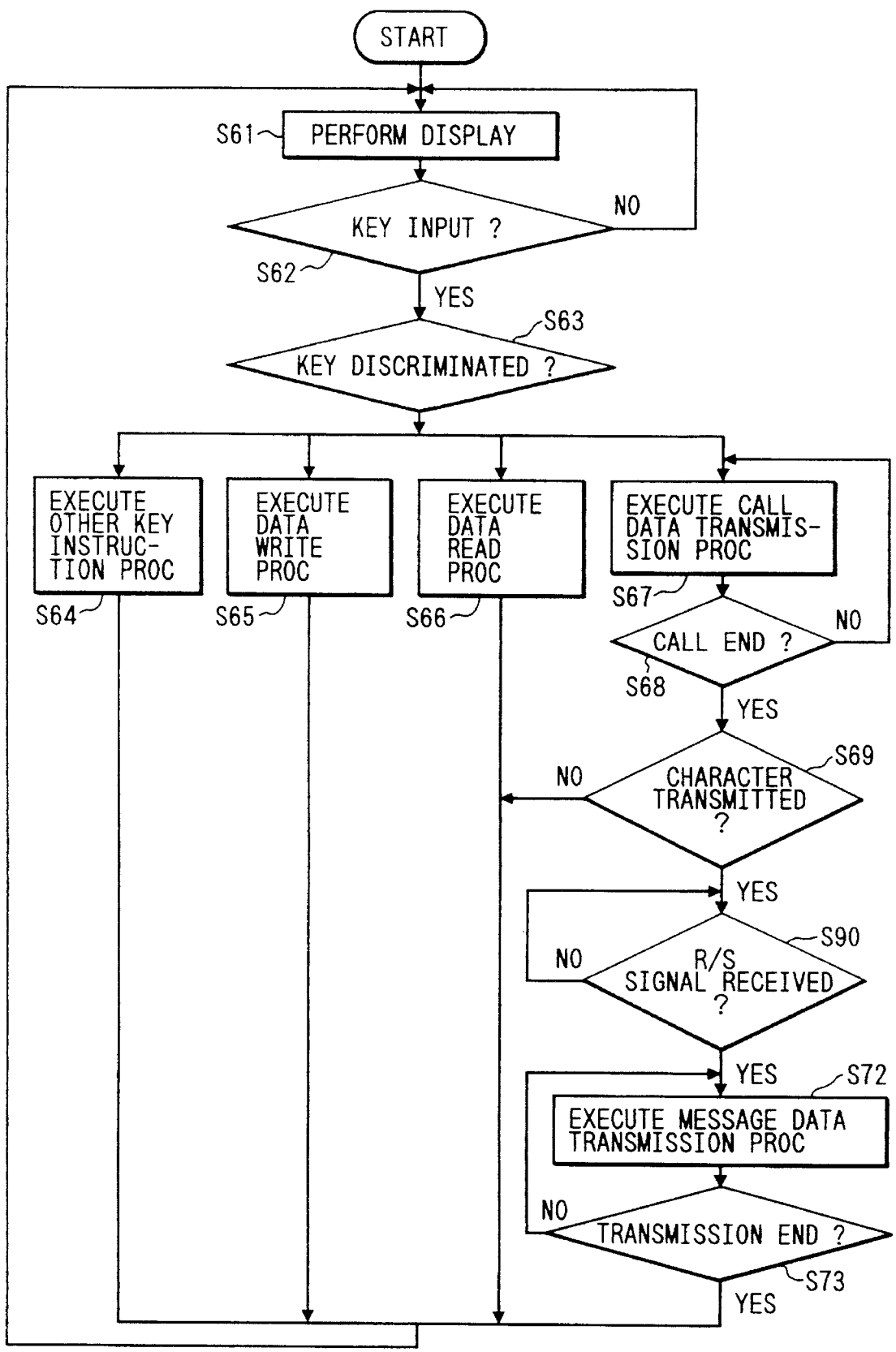
FIG. 29 is a flow chart of an electronic data memorandum according to the sixth embodiment of the present invention.

An arrangement of the electronic card memorandum 30 is identical to that in FIG. 26, and its processing sequence is shown in FIG. 29. The operations in steps S61 to S69 in FIG. 29 are the same as those in FIG. 27. It is discriminated in step S69 whether character data (e.g., destination and sender's name data) are designated by an operator. If NO in step S69, an instruction decoder 6 returns to step S61. However, if YES in step S69, it discriminates in step S90 whether character transmission is O.K., i.e., whether the source facsimile apparatus is connected to the destination facsimile apparatus. The CPU 43 waits until the facsimile sequence is completed and a message can be transmitted. This can be discriminated in accordance with whether an R/S signal from a light-receiving element 13 is received. If YES in step S90, transmission character data after a pause code is converted into a code in accordance with a code table shown in FIG. 7, and the converted code is transmitted (step S72). It is checked in step S73 whether the data to be transmitted is ended. If NO in step S73, the flow returns to step S72, and the next data is transmitted. The operation in step S73 is repeated until YES is obtained.

FIG. 30 is a print-out result at a transmitting end upon transmission of the message shown in FIG. 11 when data received from the electronic data memorandum is added to the transmission FAX original image and a copy of the transmission data is printed out at the transmitting side. The print-out result includes transmission date data 29-1, message page count data 29-2, a destination and sender's name column 29-4 obtained by synthesizing the destination and sender's name data sent from the electronic data memorandum in the message destination and sender's name column, and reference number data 29-3 representing the number of times of use of the message data.

The electronic data memorandum sends dial number data and this data is received by the host facsimile apparatus. The host facsimile apparatus then performs a call operation. In this case, when a line is busy and the source facsimile apparatus cannot be connected to the destination facsimile apparatus, an R/S signal sent from the source facsimile apparatus cannot be received by the electronic data memorandum. The instruction decoder 6 does not count up the number of times of use of the message data. However, when the source facsimile apparatus is connected to the destination facsimile apparatus, the source facsimile apparatus outputs an R/S signal. The instruction decoder 6 in the electronic data memorandum receives this R/S signal and counts up the number of times of transmission. The electronic data memorandum sends this data together with the destination name data and the like to the source facsimile apparatus.

FIG. 31 shows a print-out result at the destination facsimile apparatus upon transmission of data with the reference number data 15-3. The print-out result includes transmission date data 30-1, message page count data 30-2, a message 30-4 input and sent from the read unit in the source facsimile apparatus, and a destination and sender's name column 30-5 in which destination and sender's name data from the electronic data memorandum are filled out.

According to this embodiment as described above, necessary data can be obtained from the card 30. This effect is not limited to the facsimile apparatus but can be obtained by a portable computer utilizing a card having the same arrangement as that of the card 30.

According to this embodiment, as described above, additional information from a transmission information generating apparatus is received and added to transmission image information, and the additional information can be transmitted without using a memory of the image transmission apparatus. Therefore, operability of transmission of an image transmitting apparatus shared by a plurality of users can be improved.

Second image information generated by the image transmitting apparatus can be changed in accordance with first image information sent from the transmission information generating apparatus. Even if the first image information is not sent, it is compensated by the image transmission apparatus.

Upon detection of a transmissible state of an image prior to image transmission, a response signal is sent to the transmission information generating apparatus, and the image signal can be obtained from the transmission information generating apparatus after an image transmissible state is obtained.

The present invention has been described with reference to the particular preferred embodiments, but is not limited thereto. Various changes and modifications may be made within the spirit and scope of the appended claims.

What is claimed is:

1. An image data processing system comprising:
   (A) a portable device which comprises:
   (1) a first memory for storing therein first image data, and
   (2) first light-emitting means for emitting light in accordance with first image data stored in said first memory, and
   (B) an image data processing apparatus which comprises:
   (1) first light-receiving means for receiving the light from said first light-emitting means,
   (2) a second memory for storing therein second image data, and
   (3) process means, including selecting means for selecting one of the first and second image data based on whether or not the light according to the first image data is received by said first light-receiving means, for selecting and processing the first image data, and not the second image data, if the light according to the first image data is received by said first light-receiving means,
   wherein said process means selects and processes the second image data if the light according to the first image data is not received by said first light-receiving means.

2. A system according to claim 1, wherein said process means performs an image synthesizing process.

3. A system according to claim 1, wherein said process means comprises read means for reading an original document and synthesizes the first image represented by the light received by said first light-receiving means and an image read by said read means.

4. A system according to claim 1, wherein said process means performs the process at a timing according to the reception by said first light-receiving means.

5. A system according to claim 1, wherein said first light-emitting means comprises a light-emitting diode and said first light-receiving means comprises a light receiving means.

6. A system according to claim 1, wherein said portable device further comprises an instruction key for instructing the light emission to said first light-emitting means and said first light-emitting means emits the light on the basis of the instruction of said instruction key.

7. A system according to claim 1, wherein said image data processing apparatus further comprises second light-emitting means for emitting a light in accordance with a control signal,
   said portable device further comprises second light-receiving means for receiving the light from said second light-emitting means, and
   said first light-emitting means emits the light on the basis of said second-light receiving means.

8. A system according to claim 7, wherein after said first light-emitting means emits the light in accordance with the first image data stored in said first memory, said first light-emitting means again emits the light in accordance with the first image data on the basis of said second light-receiving means.

9. A system according to claim 7, wherein said second light emitting means emits the light after first reception by said first light-receiving means and before second reception by said first light-receiving means.

10. A system according to claim 7, wherein said second light-emitting means emits the light on the basis of a reception abnormality of said first light-receiving means.

11. A system according to claim 7, wherein said second light-emitting means comprises a light-emitting diode and said second light-receiving means comprises a light-receiving element.

12. A system according to claim 1, wherein said selecting means selects one of the first and second image data in accordance with whether or not the image data of a predetermined form is received by said first light-receiving means.

13. A system according to claim 12, wherein said selecting means selects the first image data from the first and second image data in accordance with whether or not the image data of the predetermined form is received by said first light-receiving means.

14. A system according to claim 1, wherein said selecting means selects one of the first and second image data in accordance with whether or not the first image data is received by said first light-receiving means after a predetermined code.

15. A system according to claim 1, wherein the first image data represents an identification of the portable device and the second image data represents an identification of said image data processing apparatus.

16. A system according to claim 1, wherein said process means processes the second image data if the light according to the first image data is not received by said first light-receiving means in a state in which the portable device is connected to said image data processing apparatus.

17. A system according to claim 1, wherein said process means processes the second image data if the light not including the first image data is received by said first light-receiving means.

18. An image processing system comprising:
(A) a portable device which comprises:
  (1) a first memory for storing therein first image data,
  (2) first transmission means for transmitting transmission data, and
  (3) an instruction key for instructing said first transmission means to transmit the transmission data, and
(B) an image processing apparatus which comprises:
  (1) first reception means for receiving the transmission data transmitted by said first transmission means,
  (2) a second memory for storing therein second image data, and
  (3) process means, including means for selecting one of the first and second image data based on whether or not the first image data is included in the transmission data received by said receiving means, for selecting and processing the first image data, and not the second image data, if the transmission data received by said first reception means includes the first image data, wherein said process means selects and processes the second image data stored in said second memory if the transmission data does not include the first image data.

19. A system according to claim 18, wherein said first transmission means transmits the image data in accordance with the instruction by said instruction key.

20. A system according to claim 18, wherein said process means performs an image synthesizing process on the basis of the first image data received by said first reception means and the second image data stored in said second memory.

21. A system according to claim 18, wherein said process means comprises read means for reading an original document and synthesizes image data read by said read means with a selected one of the first image data and the second image data.

22. A system according to claim 18, wherein said first transmission means comprises light-emitting means and said first reception means comprises light-receiving means.

23. A system according to claim 18, wherein said first transmission means comprises a light-emitting diode and said first reception means comprises a light-receiving element.

24. A system according to claim 18, wherein said image processing apparatus further comprises second transmission means for transmitting a control signal, said portable device further comprises second reception means for receiving the control signal transmitted by said second transmission means, and said first transmission means transmits the image data on the basis of the instruction by said instruction key and the control signal reception by said second reception means.

25. A system according to claim 24, wherein said first transmission means transmits the first image data if the control signal is received by said second reception means after the instruction by said instruction key.

26. A system according to claim 24, wherein said second transmission means comprises light-emitting means and said second reception means comprises light-receiving means.

27. A system according to claim 24, wherein said second transmission means comprises a light-emitting diode and said second reception means comprises a light-receiving element.

28. A system according to claim 18, wherein said selecting means selects one of the first and second image data and processes the selected one of the first and second image data at a timing according to the reception by said reception means.

29. A system according to claim 28, wherein said selecting means selects one of the first and second image data in accordance with whether or not image data of a predetermined form is received by said first reception means.

30. A system according to claim 29, wherein said selecting means selects the first image data from the first and second image data if the image data of the predetermined form is received by said first reception means.

31. A system according to claim 28, wherein said selecting means selects one of the first and second image data in accordance with whether or not the first image data is received by said first reception means after a predetermined code.

32. A system according to claim 18, wherein the first image data represents an identification of the portable device and the second image data represents an identification of said image processing apparatus.

33. A system according to claim 18, wherein said process means processes the second image data if the light according to the first image data is not received by said first reception means in a state in which the portable device is connected to said image processing apparatus.

34. An image data processing apparatus comprising:
connection means for connecting a portable device;
light-receiving means for receiving light representing first image data from the portable device;
memory means for storing therein second image data; and
process means, including selecting means for selecting one of the first and second image data based on whether or not the light representing the first image data is received by said first light-receiving means, for selecting and processing the first image data, and not the second image data, if the light representing the first image data is received by said light-receiving means,
wherein said process means selects and processes the second image data if the light representing the first image data is not received by said light-receiving means.

35. An apparatus according to claim 34, wherein said process means processes the image data at a timing according to the reception by said light-receiving means.

36. An apparatus according to claim 34, wherein said selecting means selects one of the first and second image data in accordance with whether or not image data of a predetermined form is received by said light-receiving means.

37. An apparatus according to claim 36, wherein said selecting means selects the first image data from the first and second image data in accordance with whether or not the image data of the predetermined form is received by said light-receiving means.

38. An apparatus according to claim 34, wherein said selecting means selects one of the first and second image data in accordance with whether or not the first image data is received after a predetermined code.

39. An apparatus according to claim 34, wherein the first image data represents an identification of the portable device and the second image data represents an identification of said image data processing apparatus.

40. An apparatus according to claim 34, wherein said process means processes the second image data if the light representing the first image data is not received by said light-receiving means in a state in which the portable device is connected to said image data processing apparatus.

41. An apparatus according to claim 34, wherein said process means performs an image synthesizing process.

42. An apparatus according to claim 34, wherein said process means synthesizes a read original image and images of the first and second image data.

43. An image data processing apparatus comprising:

connection means for connecting a portable device;

reception means for receiving first image data from the portable device;

memory means for storing therein second image data; and process means, including selecting means for selecting one of the first and second image data based on whether or not the first image data is received by said reception means, for selecting and processing the first image data, and not the second image data, if the first image data is received by said reception means, wherein said process means selects and processes the second image data if the first image data is not received by said reception means.

44. An apparatus according to claim 43, wherein said process means processes the image data at a timing according to the reception by said reception means.

45. An apparatus according to claim 43, wherein said selecting means selects one of the first and second image data in accordance with whether or not image data of a predetermined form is received by said reception means.

46. An apparatus according to claim 45, wherein said selecting means selects the first image data from the first and second image data if the image data of the predetermined form is received by said reception means.

47. An apparatus according to claim 43, wherein said selecting means selects one of the first and second image data in accordance with whether or not the first image data is received by said reception means after a predetermined code.

48. An apparatus according to claim 43, wherein the first image data represents an identification of the portable device and the second image data represents an identification of said image data processing apparatus.

49. An apparatus according to claim 43, wherein said process means processes the second image data if a light according to the first image data is not received by said reception means in a state in which the portable device is connected to said image data processing apparatus.

50. An apparatus according to claim 43, wherein said process means performs an image synthesizing process.

51. An apparatus according to claim 43, wherein said process means synthesizes a read original image and images of the first and second image data.

52. An apparatus according to claim 43, wherein said reception means comprises light-receiving means for receiving a light representing the first image data from the portable device.

53. An image data processing method, comprising the steps of:

enabling reception of first image data from a portable device;

selecting one of the first image data and second image data stored in a memory based on whether or not the first image data is received from the portable device;

processing the first image data, and not the second, if the first image data is received and selected; and processing the second image data if it is discriminated in said discriminating step that the first image data is not received.

54. A method according to claim 53, wherein the first image data is processed in said processing step if the first image data is received.

55. A method according to claim 53, wherein the first image data represents an identification of the portable device, and the second image data represents an identification of an image data processing apparatus.

56. A method according to claim 53, wherein the second image data is synthesized with a read original image in said second image data processing step.

57. A method according to claim 53, wherein the data is received as an optical signal from the portable device.

58. An image data processing method, comprising the steps of:

receiving first image data from a portable device;

discriminating whether or not a blank which is included in second image data in a memory is larger than a predetermined size, wherein the blank is of variable size;

performing an image size conversion on the first image data to provide converted first image data based on a discrimination on said discriminating step; and synthesizing the second image data and the converted first image data.

59. A method according to claim 58, wherein the first image data represents an identification of the portable device.

60. A method according to claim 58, wherein the data is received as an optical signal from the portable device.

61. A method according to claim 58, wherein it is discriminated in said discriminating step whether or not the predetermined blank is included in a beginning of the second image data.

62. A method according to claim 58, wherein the converted first image data is synthesized in a beginning of the second image data.

63. An image data processing method, comprising:

a receiving step of receiving first image data from a portable device;

a discriminating step of discriminating whether or not a blank which is included in second image data in a memory is larger than a predetermined size, wherein the blank is of variable size;

a first synthesizing step of synthesizing the first and second image data such that the first image data is synthesized in the blank included in the second image data when the blank larger than the predetermined size is included in the second image data; and a second synthesizing step of synthesizing the first and second image data such that the first image data is synthesized in a peripheral area of the second image data when no blank larger than the predetermined size is included in the second image data.

64. A method according to claim 63, wherein the first image data represents an identification of the portable device.

65. A method according to claim 63, wherein the first image data is received as an optical signal from the portable device.

* * * * *

UNITED STATES PATENT AND TRADEMARK OFFICE
CERTIFICATE OF CORRECTION

PATENT NO. : 5,602,652

DATED : February 11, 1997

INVENTOR(S) : MASUMI ISHIWATARI ET AL.   Page 1 of 3

It is certified that error appears in the above-identified patent and that said Letters Patent is hereby corrected as shown below:

On the title page: Item

[76] INVENTORS

"Masumi Ishiwatari; Tsuyoshi Kawanabe, both of c/o Canon Kabushiki Kaisha, 30-2, 3-chome, Shimomaruko, Ohta-ku, Tokyo, Japan" should read --Masumi Ishiwatari, Zushi-shi; Tsuyoshi Kawanabe, Yokohama-shi, both of Japan--.

[63] RELATED U.S. APPLICATION DATA

"Apr. 19, 1992 " should read --Apr. 13, 1992--.

[56] REFERENCES CITED

Insert: After "Primary Examiner - Andrew Johns"
--*Attorney, Agent, or Firm* - Fitzpatrick, Cella, Harper & Scinto--.

COLUMN 1

Line 5, "continuation-in-part" should read --continuation--.
Line 21, "a," should read --a--.

UNITED STATES PATENT AND TRADEMARK OFFICE
CERTIFICATE OF CORRECTION

PATENT NO. : 5,602,652

DATED : February 11, 1997

INVENTOR(S) : MASUMI ISHIWATARI ET AL.

It is certified that error appears in the above-identified patent and that said Letters Patent is hereby corrected as shown below:

COLUMN 4

Line 12, "ill" should read --in--.

COLUMN 5

Line 22, "sendee's" should read --sender's--.

COLUMN 11

Line 13, "demodulates" should read --demodulated--.

COLUMN 13

Line 38, "t6" should read --to--.

COLUMN 14

Line 16, "line)," should read --line,--.

COLUMN 16

Line 24, "light receiving " should read --light-receiving--.
Line 25, "means." should read --element.--.
Line 48, "light emitting" should read --light-emitting--.

UNITED STATES PATENT AND TRADEMARK OFFICE
CERTIFICATE OF CORRECTION

PATENT NO. : 5,602,652

DATED : February 11, 1997

INVENTOR(S) : MASUMI ISHIWATARI ET AL.

Page 3 of 3

It is certified that error appears in the above-identified patent and that said Letters Patent is hereby corrected as shown below:

<u>COLUMN 20</u>

```
Line 7, "discriminating" should read --selecting--.
Line 28, "on" should read --in--.
```

Signed and Sealed this

Fifteenth Day of August, 2000

Attest:

Q. TODD DICKINSON

*Attesting Officer*

*Director of Patents and Trademarks*

UNITED STATES PATENT AND TRADEMARK OFFICE
CERTIFICATE OF CORRECTION

PATENT NO. : 5,602,652
DATED : February 11, 1997
INVENTOR(S) : Masumi Ishiwatari et al.

It is certified that error appears in the above-identified patent and that said Letters Patent is hereby corrected as shown below:

Item [76],
Inventors,"Masumi Ishiwatari; Tsuyoshi Kawanabe, both of c/o Canon Kabushiki Kaisha, 30-2, 3-chome, Shimomaruko, Ohta-ku, Tokyo, Japan" should read -- Masumi Ishiwatari, Zushi-shi; Tsuyoshi Kawanabe, Yokohama-shi, both of Japan --.

Item [73] Assignee,
Insert: -- [73] ASSIGNEE: Canon Kabushiki Kaisha, Tokyo, Japan --.

Item [63], Related U.S. Application Data,
"Apr. 19, 1992" should read -- Apr. 13, 1992 --.

Item [56], References Cited,
Insert: After "Primary Examiner - Andrew Johns"
-- *Attorney, Agent, or Firm* - Fitzpatrick, Cella, Harper & Scinto --.

Column 1,
Line 5, "continuation-in-part" should read --continuation--.
Line 21, "a," should read -- a --.

Column 4,
Line 12, "ill" should read -- in --.

Column 5,
Line 22, "sendee's" should read -- sender's --.

Column 11
Line 13, "demodulates" should read -- demodulated --.

Column 13,
Line 38, "t6" should read -- to --.

Column 14,
Line 16, "line)," should read -- line, --.

Column 16,
Line 24, "light receiving" should read -- light-receiving --.
Line 25, "means." should read -- element. --.
Line 48, "light emitting" should read -- light-emitting --.

UNITED STATES PATENT AND TRADEMARK OFFICE
CERTIFICATE OF CORRECTION

PATENT NO. : 5,602,652
DATED : February 11, 1997
INVENTOR(S) : Masumi Ishiwatari et al.

It is certified that error appears in the above-identified patent and that said Letters Patent is hereby corrected as shown below:

Column 20,
Line 7, "discriminating" should read -- selecting --.
Line 28, "on" should read -- in --.

Signed and Sealed this

Sixth Day of November, 2001

Attest:

NICHOLAS P. GODICI
Attesting Officer     Acting Director of the United States Patent and Trademark Office